United States Patent
Wang et al.

(10) Patent No.: US 11,347,907 B2
(45) Date of Patent: May 31, 2022

(54) SYSTEMS AND METHODS FOR DISTRIBUTED POWER SYSTEM MODEL CALIBRATION

(71) Applicant: General Electric Company, Schenectady, NY (US)

(72) Inventors: Honggang Wang, Clifton Park, NY (US); Yuh-Shyang Wang, Schenectady, NY (US); Junqiang Zhou, San Jose, CA (US); Pengyuan Wang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 202 days.

(21) Appl. No.: 16/690,965

(22) Filed: Nov. 21, 2019

(65) Prior Publication Data

US 2020/0327206 A1 Oct. 15, 2020

Related U.S. Application Data

(60) Provisional application No. 62/833,492, filed on Apr. 12, 2019.

(51) Int. Cl.
*G06F 30/20* (2020.01)
*G06F 30/18* (2020.01)
(Continued)

(52) U.S. Cl.
CPC ............... *G06F 30/20* (2020.01); *G06F 7/58* (2013.01); *G06F 30/18* (2020.01); *G06N 7/005* (2013.01);
(Continued)

(58) Field of Classification Search
CPC ............ G06F 30/20; G06F 30/18; G06F 7/58; G06N 7/005; H02J 3/008
See application file for complete search history.

(56) References Cited

U.S. PATENT DOCUMENTS 9,092,593 B2   7/2015   Nasle
9,633,315 B2   4/2017   Chapelle et al.
(Continued)

FOREIGN PATENT DOCUMENTS

CN   109119999 A   1/2019
CN   106786671 B   5/2019
(Continued)

OTHER PUBLICATIONS

Zhang, Y., Dall'Anese, E. and Hong, M., Nov. 2017. Dynamic ADMM for real-time optimal power flow. In 2017 IEEE Global Conference on Signal and Information Processing (GlobalSIP) (pp. 1085-1089). IEEE. (Year: 2017).*
(Continued)

*Primary Examiner* — Chuen-Meei Gan
(74) *Attorney, Agent, or Firm* — Armstrong Teasdale LLP

(57) ABSTRACT

A computing device for distributed power system model calibration is provided. The computing device is programmed to receive event data and model response data associated with a model to simulate, wherein the model includes a plurality of parameters, divide the event data into a plurality of sets, wherein each set includes associated parameters, and transmit the plurality of sets of event data to a plurality of client nodes. Each client node of the plurality of client nodes is programmed to analyze a corresponding set of event data to determine updated parameters for the model. The computing device is further programmed to receive a plurality of updated parameters for the model from the plurality of client nodes and analyze the received plurality of updated parameters to determine at least one adjusted parameter.

18 Claims, 18 Drawing Sheets

(51) Int. Cl.
    G06F 7/58      (2006.01)
    H02J 3/00      (2006.01)
    G06N 7/00      (2006.01)
    G06F 119/06    (2020.01)
    G06F 113/04    (2020.01)
    G06F 111/10    (2020.01)
    G06F 111/02    (2020.01)
    G06Q 50/06     (2012.01)
    G06F 17/14     (2006.01)

(52) U.S. Cl.
    CPC .............. *H02J 3/008* (2013.01); *G06F 17/14* (2013.01); *G06F 2111/02* (2020.01); *G06F 2111/10* (2020.01); *G06F 2113/04* (2020.01); *G06F 2119/06* (2020.01); *G06Q 50/06* (2013.01); *H02J 3/003* (2020.01); *H02J 2203/20* (2020.01)

(56) References Cited

U.S. PATENT DOCUMENTS

| | | | |
|---|---|---|---|
| 9,864,820 | B2 | 1/2018 | Shokooh et al. |
| 10,371,740 | B2 | 8/2019 | Cui et al. |
| 2015/0100282 | A1* | 4/2015 | Shokooh .................. G06F 30/20 703/2 |
| 2015/0149128 | A1 | 5/2015 | Baone et al. |
| 2015/0326023 | A1* | 11/2015 | Adelberger ............... H02J 3/06 307/24 |
| 2017/0147920 | A1 | 5/2017 | Huo et al. |
| 2018/0150770 | A1* | 5/2018 | Shaoib .................... G06N 20/00 |
| 2018/0373824 | A1 | 12/2018 | Meagher et al. |
| 2019/0184850 | A1* | 6/2019 | Lee ........................ B60L 53/51 |
| 2020/0119557 | A1* | 4/2020 | Claessens .............. G06Q 50/06 |

FOREIGN PATENT DOCUMENTS

| | | |
|---|---|---|
| KR | 101219545 B1 | 1/2013 |
| WO | 2018120893 A1 | 7/2018 |

OTHER PUBLICATIONS

Chang, T.H., Hong, M., Liao, W.C. and Wang, X., 2016. Asynchronous distributed ADMM for large-scale optimization—Part I: Algorithm and convergence analysis. IEEE Transactions on Signal Processing, 64(12), pp. 3118-3130. (Year: 2016).*

Willett., "Similarity-Based approaches to Virtual Screening", Biochem Soc Trans, pp. 603-606, Jun. 2003.

Conto et al., "Power system model validation", NERC White Paper, Dec. 2010.

Xu et al., "Response-Surface-Based Bayesian Inference for Power System Dynamic Parameter Estimation", IEEE Transactions on Smart Grid, pp. 1-11, Jan. 2019.

Kristensen et al., "Methods for Similarity-based Virtual Screening", Comput Struct Biotechnol, vol. 05, Issue: 06, pp. 1-6, 2013.

Jiao et al., "Load Model Verification, Validation and Calibration Framework by Statistical Analysis on Field Data", International Journal of Emerging Electric Power Systems, vol. 18, Issue: 06, pp. 1-7, Nov. 22, 2017.

Huang et al.,"Generator Dynamic Model Validation and Parameter Calibration Using Phasor Measurements at the Point of Connection", IEEE Transactions on Power Systems, vol. No. 28, Issue No. 02, pp. 1939-1949, Mar. 26, 2013.

Ma et al., "Use Multi-Dimensional Ellipsoid to Monitor Dynamic Behavior of Power Systems Based on PMU Measurement", 2008 IEEE Power and Energy Society General Meeting—Conversion and Delivery of Electrical Energy in the 21st Century, Pittsburgh, PA, USA, pp. 1-8, Jul. 20-24, 2008.

Zarraga., "On-line Extraction of Modal Characteristics from Power System Measurements Based on Hilbert-Huang Analysis", 2009 6th International Conference on Electrical Engineering, Computing Science and Automatic Control (CCE), Conference Location: Toluca, Mexico, pp. 01-06, Jan. 10-13, 2009.

Allen et al., "Algorithm for Screening PMU Data for Power System Events", 2012 3rd IEEE PES Innovative Smart Grid Technologies Europe (ISGT Europe),Conference Location: Berlin, Germany,pp. 1-6, Oct. 14-17, 2012.

Zhang, Ruiliang et al., "Asynchronous Distributed ADMM for Consensus Optimization," Department of Computer Science and Engineering, Hong Kong University of Science and Technology, Hong Kong, 2014.

* cited by examiner

| Sub-system name | Sub-system | POI(s) | Generator(s) |
|---|---|---|---|
| S1 | G1 —— T1 | T1 | G1 |
| S2 | GA, GB —— TA | TA | GA / GB |
| S3 | GEN1 —— TA, TX, TY | TX, TY | GEN1 |

TABLE 1

FIG. 3B

SYSTEMS AND METHODS FOR DISTRIBUTED POWER SYSTEM MODEL CALIBRATION

CROSS REFERENCE TO RELATED APPLICATIONS

This application claims the benefit of priority to U.S. Provisional Patent Application No. 62/833,492, filed Apr. 12, 2019, entitled "SYSTEMS AND METHODS FOR SEQUENTIAL POWER SYSTEM MODEL PARAMETER ESTIMATION," the entire contents and disclosure of which are incorporated by reference in its entirety.

STATEMENT REGARDING FEDERALLY SPONSORED RESEARCH & DEVELOPMENT

This invention was made with government support under U.S. Government Contract Number: DE-OE0000858 awarded by the Department of Energy. The government has certain rights in the invention.

BACKGROUND

The field of the invention relates generally to power system model validation and calibration, and more particularly, to a system for distributed processing of modeling power systems based on multiple events.

During the 1996 Western System Coordinating Council (WSCC) blackout, planning studies conducted using dynamic models had predicted stable system operation, whereas the real system became unstable in a few minutes with severe swings. To ensure the models represent the real system accurately, the North American Electric Reliability Coordinator (NERC) requires generators above 20 MVA to be tested every 5 years or 10 years (depending on their interconnection) to check the accuracy of dynamic models and update the power plant dynamic models as necessary.

Some of the methods of performing calibration on the model include performing staged tests and direct measurement of disturbances. In a staged test, a generator is first taken offline from normal operation. While the generator is offline, the testing equipment is connected to the generator and its controllers to perform a series of predesigned tests to derive the desired model parameters. This method may cost $15,000-$35,000 per generator per test in the United States and includes both the cost of performing the test and the cost of taking the generator offline. Phasor Measurement Units (PMUs) and Digital Fault Recorders (DFRs) have seen dramatic increasing installation in recent years, which allows for non-invasive model validation by using the sub-second-resolution dynamic data. Varying types of disturbances across locations in the power system along with large installed base of PMUs makes it possible to validate the dynamic models of the generators frequently at different operating conditions.

As more and more disturbances in power systems are being recorded by PMUs every day, NERC has identified that the analysis of multiple system events is beneficial for model calibration. A generator or load model built from only one or two field tests may not be a sufficiently robust model, because it may overfit some specific event and lack the ability to fit new, fresh measured load curves. Furthermore, as more events and/or larger systems are analyzed, there is a need to improve the scalability of the models. In addition, there is a need for calibration results that are robust against defective datasets and/or events. Moreover, there is also a need for systems that support both offline and online modes.

BRIEF DESCRIPTION

In one aspect, a computing device for distributed power system model calibration is provided. The computing device includes at least one processor in communication with at least one memory device. The at least one processor is programmed to receive event data and model response data associated with a model to simulate. The model includes a plurality of parameters. The at least one processor is also programmed to divide the event data into a plurality of sets. Each set includes associated parameters. The at least one processor is further programmed to transmit the plurality of sets of event data to a plurality of client nodes. Each client node of the plurality of client nodes is programmed to analyze a corresponding set of event data to determine updated parameters for the model. In addition, the at least one processor is programmed to receive a plurality of updated parameters for the model from the plurality of client nodes. Moreover, the at least one processor is programmed to analyze the received plurality of updated parameters to determine at least one adjusted parameter.

In another aspect, a system for distributed power system model calibration is provided. The system includes a master node and a plurality of client nodes in communication with the master node. The master node is programmed to receive event data and model response data associated with a model to simulate. The model includes a plurality of parameters. The master node is also programmed to divide the event data into a plurality of sets. Each set includes associated parameters. The master node is further programmed to transmit the plurality of sets of event data to a plurality of client nodes. In addition, the master node is programmed to receive a plurality of updated parameters for the model from the plurality of client nodes. Moreover, the master node is programmed to analyze the received plurality of updated parameters to determine at least one adjusted parameter. The plurality of client nodes are programmed to receive a set of event data from the master node. The plurality of client nodes are also programmed to analyze the set of event data to determine updated parameters for the model. The plurality of client nodes are further programmed to transmit the updated parameters to the master node.

In yet a further aspect, a method for distributed power system model calibration is provided. The method is implemented on a computing device including at least one processor in communication with at least one memory device. The method includes receiving event data and model response data associated with a model to simulate. The model includes a plurality of parameters. The method also includes dividing the event data into a plurality of sets. Each set includes associated parameters. The method further includes transmitting the plurality of sets of event data to a plurality of client nodes. Each client node of the plurality of client nodes is programmed to analyze a corresponding set of event data to determine updated parameters for the model. In addition, the method includes receiving a plurality of updated parameters for the model from the plurality of client nodes. Moreover, the method includes analyzing the received plurality of updated parameters to determine at least one adjustment to the plurality of parameters. Furthermore, the method includes transmitting the adjusted parameters to the plurality of client nodes. Each client node of the plurality of client nodes is programmed to analyze a corresponding set of event data to determine further updated parameters for the model. The method also includes receiving a plurality of further updated parameters for the model from the plurality of client nodes. The method further includes analyzing the received plurality of further updated parameters to determine at least one adjustment to the plurality of parameters.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3B illustrates a table of exemplary power plant sub-system definitions, in accordance with one embodiment of the disclosure.

DETAILED DESCRIPTION

Figure 1:
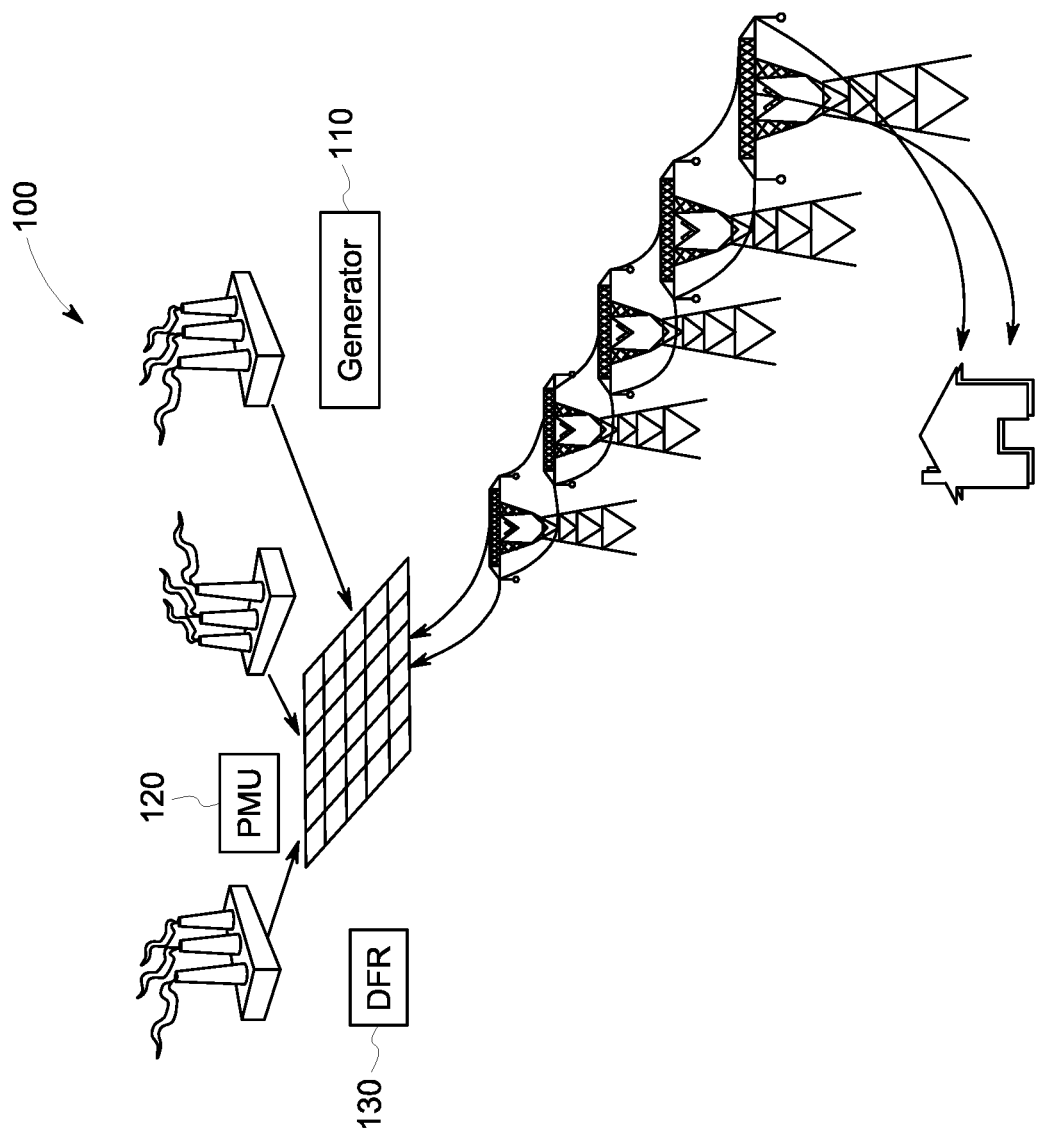
FIG. 1 illustrates a block diagram of a power distribution grid.

The systems and methods described herein are directed to distributed systems for processing of modeling power systems based on multiple events. More specifically, the systems and methods described herein are directed to a master node and a plurality of client nodes (or local nodes), where the master node distributes parameters and events to the client nodes to be analyzed. The client nodes return their analysis of their events and parameters to the master node. Then the master node compares all of the results of the analysis, calibrates one or more of the parameters, and repeats the cycle until a model of a power system has been calibrated based on the various events and parameters. In some embodiments, a calibrated model may receive a live event and determine whether or not to recalibrate based on that event.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "power system simulation" refers to power system modeling and network simulation in order to analyze electrical power systems using design/offline or real-time data. Power system simulation software is a class of computer simulation programs that focus on the operation of electrical power systems. This type of computer programs are used in a wide range of planning and operational situations for example: electric power generation—nuclear, conventional, renewable, commercial facilities, utility transmission, and utility distribution. Applications of power system simulation include, but are not limited to: long-term generation and transmission expansion planning, short-term operational simulations, and market analysis (e.g. price forecasting). A traditional simulation engine relies on differential algebraic equations (DAEs) therein to represent the relationship between voltage, frequency, active power and reactive power. Those mathematical relationships may be used to study different power systems applications including, but not limited to: load flow, short circuit or fault analysis, protective device coordination, discrimination or selectivity, transient or dynamic stability, harmonic or power quality analysis and optimal power flow.

As used herein, the term "power system devices" refers to devices that the simulation engine or simulation model represent may include: transmission systems, generating units, and loads. Transmission systems include, but are not limited to, transmission lines, power transformers, mechanically switched shunt capacitors and reactors, phase-shifting transformers, static VAR compensators (SVC), flexible AC transmission systems (FACTS), and high-voltage dc (HVDC) transmission systems. The models may include equipment controls such as voltage pick-up and drop-out levels for shunt reactive devices. Generating units include the entire spectrum of supply resources—hydro-, steam-, gas-, and geothermal generation along with rapidly emerging wind and solar power plants. The load represents the electrical load in the system, which range from simple light-bulbs to large industrial facilities.

As used herein, the term "model validation" is defined within regulatory guidance as "the set of processes and activities intended to verify that models are performing as expected, in line with their design objectives, and business uses." It also identifies "potential limitations and assumptions, and assesses their possible impact." In the power system context, the model validation assures that the model accurately represents the operation of the real system— including model structure, correct assumptions, and that the output matches actual events. There is a reason behind model validation for a power system asset. The behavior of power plants and electric grids change over time and should be checked and updated to assure that they remain accurate.

The purpose of model validation is to understand the underlying power system phenomena so they can be appropriately represented in power system studies. The eventual goal of the systems described herein is to generate a total system model that can reasonably predict the outcome of an event. However, to achieve this, the individual constituents of the system model need to be valid. The process of model validation and the eventual "validity" of the model require sound "engineering judgment" rather than being based on a simple pass/fail of the model determined by some rigid criteria. This is because any modeling activity necessitates certain assumptions and compromises, which can only be determined by a thorough understanding of the process being modeled and the purpose for which the model is to be used. Component-level model validation can be done either through staged tests or on-line disturbance based model validation.

As used herein, the term "model calibration" refers to adjustments of the model parameters to improve the model so that the model's response will match the real, actual, or measured response, given the same model input. Once the model is validated, a calibration process is used to make minor adjustments to the model and its parameters so that the model continues to provide accurate outputs. High-speed, time synchronized data, collected using phasor measurement units (PMUs), are used for model validation of the dynamic response to grid events.

As used herein, the term "Phasor Measurement Unit" (PMU) refers to a device used to estimate the magnitude and phase angle of an electrical phasor quantity (such as voltage or current) in the electricity grid using a common time source for synchronization. Time synchronization is usually provided by GPS and allows synchronized real-time measurements of multiple remote points on the grid. PMUs are capable of capturing samples from a waveform in quick succession and reconstructing the phasor quantity, made up of an angle measurement and a magnitude measurement. The resulting measurement is known as a synchrophasor. These time synchronized measurements are important because if the grid's supply and demand are not perfectly matched, frequency imbalances can cause stress on the grid, which is a potential cause for power outages.

PMUs may also be used to measure the frequency in the power grid. A typical commercial PMU may report measurements with very high temporal resolution in the order of 30-60 measurements per second. Engineers use this in analyzing dynamic events in the grid which is not possible with traditional SCADA measurements that generate one measurement every 2 or 4 seconds. Therefore, PMUs equip utilities with enhanced monitoring and control capabilities and are considered to be one of the most important measuring devices in the future of power systems. A PMU can be a dedicated device, or the PMU function can be incorporated into a protective relay or other device.

As used herein, the terms "power grid disturbance" and "power grid event" refer to outages, forced or unintended disconnection, or failed re-connection of breaker as a result of faults in the power grid. A grid disturbance starts with a primary fault and may also consist of one or more secondary faults or latent faults. A grid disturbance may, for example, be: a tripping of breaker because of lightning striking a line; a failed line connection when repairs or adjustments need to be carried out before the line can be connected to the network; an emergency disconnection due to fire; an undesired power transformer disconnection because of faults due to relay testing; and tripping with a successful high-speed automatic reclosing of a circuit breaker.

The feature of an event may comprise peak value, bottom value, overshoot percentage, a rising time, a settling time, delay time, peak time, steady state error, a phase shift, a damping ratio, an energy function, and a cumulative deviation in energy, Fourier transformation spectrum information, frequency response, principal component, minimum volume ellipsoid, steady state gain (P, Q, u, f), of the event. The feature is extracted from the time series of active power, reactive power, voltage and frequency.

PMU recordings of almost any noticeable grid event can be used for model validation. During grid disturbances, a device operates outside of its normal steady-state condition, providing an opportunity to observe the dynamic behavior of the asset during transients. The PMU data from these transient grid disturbances provides information that cannot be captured with SCADA. These transient disturbances often pose the most risk for grid stability and reliability. Some of the grid events that may generate valuable PMU data for model validation purposes include, but are not limited to:

Frequency excursion events—In a frequency excursion event, a substantial loss of load or generation causes a significant shift in electrical frequency, typically outside an interconnection's standard. PMU data on a generator's response to a frequency excursion may be used to examine the settings and performance of models of governor and automatic generation control (used to adjust the power output of a generator in response to changes in frequency).

Voltage excursion events—A fault on the system, a significant change in load or generation (including intermittent renewables), or the loss of a significant load or generation asset can cause voltage shifts. PMU data on a generator's response to a voltage excursion can be used to validate models of its excitation system, reactive capabilities, and automated voltage regulation settings (used to control the input voltage for the exciter of a generator to stabilize generator output voltage).

Device trips—Transmission devices and lines routinely trip out of service. They cause less severe impacts than a frequency or voltage excursion, but can provide similar data sets useful for model validation.

Remedial Action Scheme (RAS) activations—Useful data events for model validation can be caused by a reaction to mitigate grid disturbances. Certain grid disturbances may cause a RAS activation, which will attempt to regulate the grid back to a normal operating condition. In some systems, the RAS may include switching on devices such as shunt reactors, changing FACTS devices, or inserting braking resistance. Activation of the RAS may create additional discrete disturbance events on the system, providing frequency and voltage events that can also be used for model validation.

Probing signals—In the Western System Coordinating Council (WECC), the high-voltage direct current (HVDC) station at Celilo, Oreg., has the ability to modulate its output power to a known signal, effectively serving as a signal generator into the western power system. These signals can be used to verify and calibrate system-level and generator models' frequency responses, particularly for small-signal-stability analysis.

FIG. 1 illustrates a power distribution grid 100. The grid 100 includes a number of components, such as power generators 110. In some cases, planning studies conducted using dynamic models predict stable grid 100 operation, but the actual grid 100 may become unstable within a few minutes with severe swings (resulting in a massive blackout). To ensure that the models represent the real system accurately, the North American Electric Reliability Coordinator ("NERC") requires generators 110 above 10 MVA to be tested every five years to check the accuracy of dynamic models and let the power plant dynamic models be updated as necessary. The systems described herein consider not only active power (P) and reactive power (Q) but also voltage (U) and frequency (F).

In a typical staged test, a generator 110 is first taken offline from normal operation. While the generator 110 is offline, testing equipment is connected to the generator 110 and its controllers to perform a series of pre-designed tests to derive the desired model parameters. Recently, PMUs 120 and Digital Fault Recorders ("DFRs") 130 have seen dramatic increasing installation in recent years, which may allow for non-invasive model validation by using the sub-second-resolution dynamic data. Varying types of disturbances across locations in the grid 100 along with the large installed base of PMUs 120 may, according to some embodiments, make it possible to validate the dynamic models of the generators 110 frequently at different operating conditions. There is a need for a production-grade software tool generic enough to be applicable to wide variety of models (traditional generating plant, wind, solar, dynamic load, etc. with minimal changes to existing simulation engines. Note that model calibration is a process that seeks multiple (dozens or hundreds) of model parameters, which could suffer from local minimum and multiple solutions. There is need for an algorithm to enhance the quality of a solution within a reasonable amount time and computation burdens.

Online performance monitoring of power plants using synchrophasor data or other high-resolution disturbance monitoring data acts as a recurring test to ensure that the modeled response to system events matches actual response of the power plant or generating unit. From the Generator Owner (GO)'s perspective, online verification using high resolution measurement data can provide evidence of compliance by demonstrating the validity of the model by online measurement. Therefore, it is a cost-effective approach for GO as they may not have to take the unit offline for testing of model parameters. Online performance monitoring requires that disturbance monitoring equipment such as a PMU be located at the terminals of an individual generator or Point of Interconnection (POI) of a power plant.

The disturbance recorded by PMU normally consists of four variables: voltage, frequency, active power, and reactive power. To use the PMU data for model validation, a playback simulation has been developed. The simulated output including active power and reactive power will be generated and can be further compared with the measured active power and reactive power.

Figure 2:
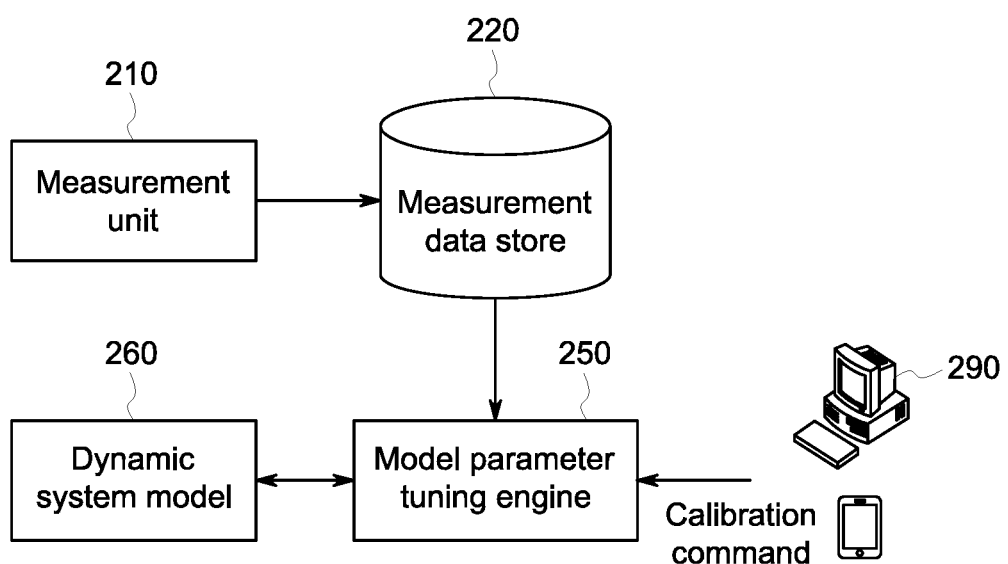
FIG. 2 illustrates a high-level block diagram of a system for performing sequential calibration in accordance with some embodiments.

To achieve such results, FIG. 2 is a high-level block diagram of a system 200 in accordance with some embodiments. The system 200 includes one or more measurement units 210 (e.g., PMUs, DFRs, or other devices to measure frequency, voltage, current, or power phasors) that store information into a measurement data store 220. As used herein, the term "PMU" might refer to, for example, a device used to estimate the magnitude and phase angle of an electrical phasor quantity like voltage or current in an electricity grid using a common time source for synchronization. The term "DFR" might refer to, for example, an Intelligent Electronic Device ("IED") that can be installed in a remote location, and that acts as a termination point for field contacts. According to some embodiments, the measurement data might be associated with disturbance event data and/or data from deliberately performed unit tests. According to some embodiments, a model parameter tuning engine 250 may access this data and use it to tune parameters for a dynamic system model 260. The process might be performed automatically or be initiated via a calibration command from a remote operator interface device 290. As used herein, the term "automatically" may refer to, for example, actions that can be performed with little or no human intervention.

Note that power systems may be designed and operated using mathematical models (power system models) that characterize the expected behavior of power plants, grid elements, and the grid as a whole. These models support decisions about what types of equipment to invest in, where to put it, and how to use it in second-to-second, minute-to-minute, hourly, daily, and long-term operations. When a generator, load, or other element of the system does not act in the way that its model predicts, the mismatch between reality and model-based expectations can degrade reliability and efficiency. Inaccurate models have contributed to a number of major North American power outages.

The behavior of power plants and electric grids may change over time and should be checked and updated to assure that they remain accurate. Engineers use the processes of validation and calibration to make sure that a model can accurately predict the behavior of the modeled object. Validation assures that the model accurately represents the operation of the real system—including model structure, correct assumptions, and that the output matches actual events. Once the model is validated, a calibration process may be used to make minor adjustments to the model and its parameters so that the model continues to provide accurate outputs. High-speed, time-synchronized data, collected using PMUs may facilitate model validation of the dynamic response to grid events. Grid operators may use, for example, PMU data recorded during normal plant operations and grid events to validate grid and power plant models quickly and at lower cost.

The transmission operators or regional reliability coordinators, or Independent System Operators, like MISO, ISO-New England, PG&E, can use this calibrated generator or power system model for power system stability study based on N-k contingencies, in every 5 to 10 minutes. If there is stability issue (transient stability) for some specific contingency, the power flow will be redirected to relieve the stress-limiting factors. For example, the output of some power generators will be adjusted to redirect the power flow. Alternatively, adding more capacity (more power lines) to the existing system can be used to increase the transmission capacity.

With a model that accurately reflects oscillations and their causes, the grid operator can also diagnose the causes of operating events, such as wind-driven oscillations, and identify appropriate corrective measures before those oscillations spread to harm other assets or cause a loss of load.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The model parameter tuning engine 250 may store information into and/or retrieve information from various data stores, which may be locally stored or reside remote from the model parameter tuning engine 250. Although a single model parameter tuning engine 250 is shown in FIG. 2, any number of such devices may be included. Moreover, various devices described herein might be combined according to embodiments of the present invention. For example, in some embodiments, the measurement data store 220 and the model parameter tuning engine 250 might be implemented as a single apparatus. The system 200 functions may be performed by a constellation of networked apparatuses, such as in a distributed processing or cloud-based architecture.

A user may access the system 200 via the device 290 (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., when a new electrical power grid component is calibrated) and/or provide or receive automatically generated recommendations or results from the system 200.

The example embodiments provide a predictive model which can be used to replace the dynamic simulation engine when performing the parameter identification and the parameter calibration. The model can be trained based on historical behavior of a dynamic simulation engine thereby learning patterns between inputs and outputs of the dynamic simulation engine. The model can emulate the functionality performed by the dynamic simulation engine without having to perform numerous rounds of simulation. Instead, the model can predict (e.g., via a neural network, or the like) a subset of parameters for model calibration and also predict/estimate optimal parameter values for the subset of parameters in association with a power system model that is being calibrated. According to the examples herein, the model may be used to capture both input-output function and first derivative of a dynamic simulation engine used for model calibration. The model may be updated based on its confidence level and prediction deviation against the original simulation engine.

Here, the model may be a surrogate for a dynamic simulation engine and may be used to perform model calibration without using DAE equations. The system described herein may be a model parameter tuning engine, which is configured to receive the power system data and model calibration command, and to search for the optimal model parameters using the surrogate model until the closeness between simulated response and the real response from the power system data meet a predefined threshold. In the embodiments described herein, the model operates on disturbance event data that includes one or more of device terminal real power, reactive power, voltage magnitude, and phase angle data. The model calibration may be triggered by user or by automatic model validation step. In some aspects, the model may be trained offline when there is no grid event calibration task. The model may represent a set of different models used for different kinds of events. In some embodiments, the model's input may include at least one of voltage, frequency and other model tunable parameters. The model may be implemented using a neural network model, fuzzy logic, a polynomial function, and the like. Other model tunable parameters may include a parameter affecting dynamic behavior of machine, exciter, stabilizer, and governor. Also, the surrogate model's output may include active power, reactive power, or both. In some cases, the optimizer may be gradient based method including Newton-like methods. For example, the optimizer may be gradient free method including pattern search, genetic algorithm, simulated annealing, particle swarm optimizer, differential evolution, and the like.

Figure 3A:
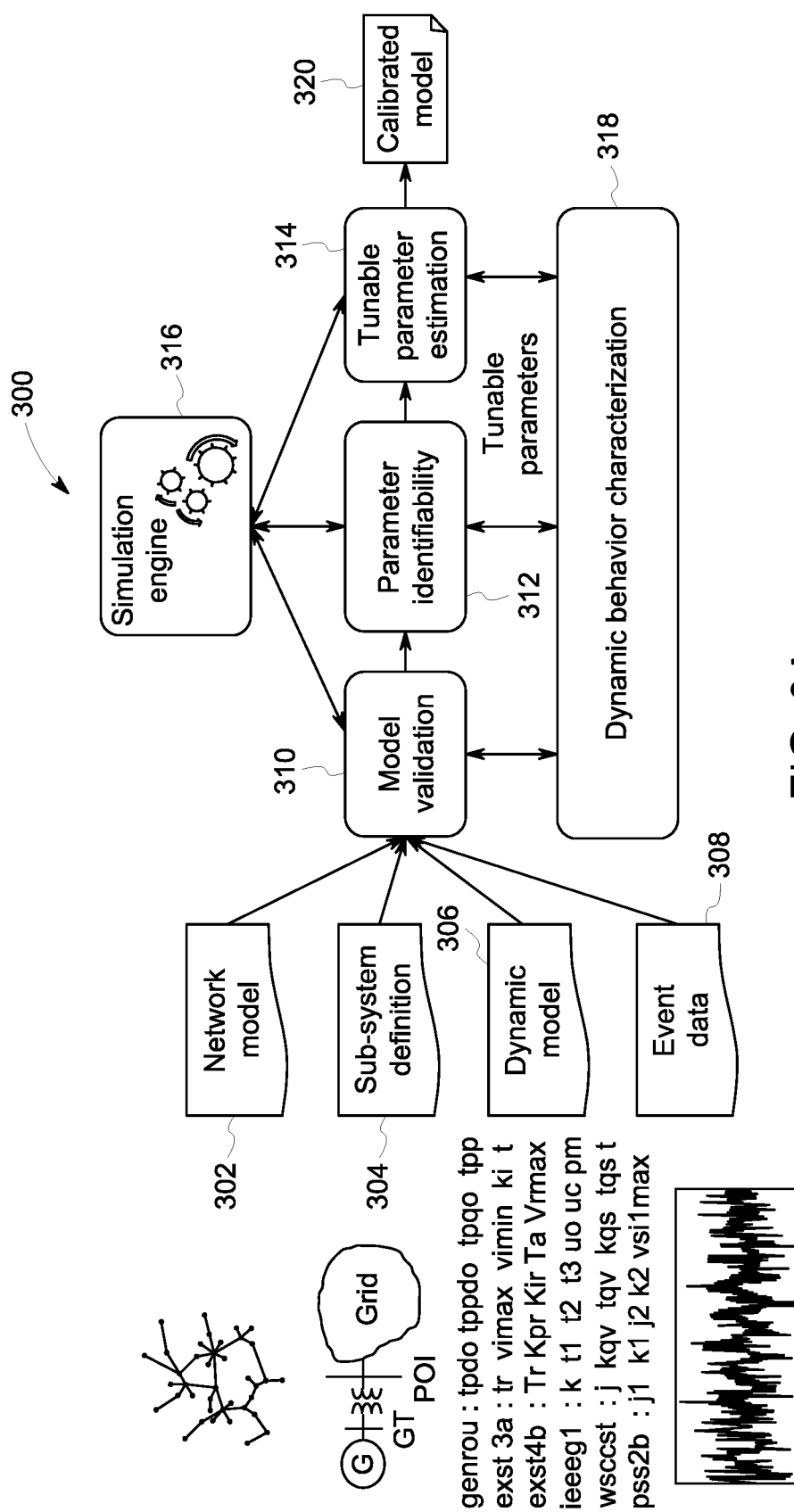
FIG. 3A illustrates a block diagram of exemplary system architecture for power system model calibration, in accordance with one embodiment of the disclosure.

FIG. 3A illustrates a block diagram of exemplary system architecture 300 for power system model calibration, in accordance with one embodiment of the disclosure. In the exemplary embodiment, the system architecture 300 receives network models 302, sub-system definitions 304, dynamic models 306, and event data 308.

Steady state network models 302 (sometimes called as power-flow data) can be either EMS or system planning models. In some embodiments, they may be in e-terra NETMOM or CIM13 format. Dynamic models 306 can be in either PSS/E or PSLF or TSAT format. The system 300 can also accept more than one dynamic data file when data is distributed among multiple files. In the exemplary embodiment, the network models 302 and the dynamic models 306 use the same naming convention for the network elements.

In the exemplary embodiment, the sub-system definitions 304 are based on the network model 302 and one or more maps of the power plant. A sub-system identification module combines the network model 302 and the one or more maps to generate the sub-system definition 304. In some embodiments, the sub-system definition 304 is provided via an XML file that defines the POI(s) and generators that makes up a power plant. Power plants are defined by generators in the plant with its corresponding POI(s). A few examples of power plant sub-system definitions are illustrated in FIG. 3B.

In the exemplary embodiment, the system 300 provides a user interface to facilitate defining the power plant starting from a potential POI. Potential POIs are identified as terminals/buses in the system having all required measurements (V, f, P, Q) to perform model validation and calibration. A measurement mapping module identifies terminals with V, f, P, Q measurements and lets the user search for radially connected generators starting from potential POIs. Sub-system definitions 304 may also be saved for future use. In some embodiments, a sub-system definition 304 is defined for each event 308.

Events 308 are where the voltage and/or the frequency of the power system changes. For example, an event 308 may be a generator turning on. In some embodiments, the event 308 has the same or similar attributes to a previous event 308, such as that same generator turning on, the event 308 is skipped to reduce redundant processing. In the exemplary embodiment, the event data or Phasor data 308 will be imported from a variety of sources, such as, but not limited to, e-terraphasorpoint, openPDC, CSV files, COMTRADE files and PI historian. In the exemplary embodiment, the POIs will have at least voltage, frequency, real power and reactive power measurements. In some embodiments, voltage angle is substituted for frequency.

The network models 302, sub-system definitions 304, dynamic models 306, and event data 308 are analyzed by the system 300 as described herein. In the exemplary embodiment disclosed herein, the model utilizes multiple disturbance events to validate and calibrate power system models for compliance with NERC mandated grid reliability requirements.

More specifically, the network models 302, sub-system definitions 304, dynamic models 306, and event data 308 are analyzed and validated by the model validation component 310. If the models are validated, then the corresponding data is sent to a parameter identifiability component 312. This component 312 analyzes the event and models to determine which parameters are significant for this event 308. Then the tunable parameters are transmitted to a tunable parameter estimation component 314, which further analyzes the significant parameters to calibrate the parameters in the model being executed by the simulation engine 316. In the exemplary embodiment, the model validation component 310, the parameter identifiability component 312, and the tunable parameter estimation component 314 are all in communication with a dynamic behavior characterization component 318, which extracts features from the events 308, generates weights for those features, and provides the user the ability to fine tune the model calibration and add subject matter expert knowledge to the model calibration process. The end result is a fully calibrated model 320. The steps in this process are further described below.

In the exemplary embodiment, the model validation component 310 validates the models 302 and 306 and definitions 304 that are being input into the system 300. In at least one embodiment, a typical synchronous generator model has four parts: machine model, turbine-governor model, excitation model and power system stabilizer (PSS) model. The model validation component 310 validates the provided models based on a collection of published NERC List of Acceptable Models, user preferences, and historical data. In some embodiments, there may also be prohibited model lists that are evaluated. Furthermore, units with a power system stabilizer (PSS) should have an excitation system model.

In the exemplary embodiment, the user will be notified if any prohibited model or missing excitation model has been identified. Based on this information, the user can further correct the dynamic model 306 if there is human error, or to use the model conversion module to convert any prohibited model to the valid models before evaluating the curve fitting performance. Of course, the user can also ignore the warning and continue the model validation and calibration process.

The second step is the parameter identifiability. The goal of this step is to perform a comprehensive identifiability study across the models 302 and 306, the definitions 304, and the events 308 and provide an identifiable parameter set for the simultaneous calibration which tunes the most identifiable parameters. The parameter identifiability component 312 analyzes the parameters to identify potential parameters for use based on the dot product (or scalar product) of the columns of J and r as defined below. In the exemplary embodiment, r is called residual which is the difference between the measured response data series and the simulated response data series where:

$$r(p) = y_t^m - y_t(x) \qquad \text{EQ. 1}$$

where $y_t^m$ is the measured response of active and reactive power provided in the event data 308, $y_t(x)$ is the simulated response of active and reactive power based on dynamic simulation engine, including but not limited to, GE's PSLF, Siemens PTI's PSS/E, etc. x represents the model parameters.

The parameter identifiability component 312 uses the sum of squares (SOS) objective: $\|r(x)\|_2^2$. Then the parameter identifiability component 312 uses the Quadratic Model (QM) of the objective at $(x_k+d)$ to approximate the next step like $r(x_{k+1})$.

$$QM(J_k, r_k, d) = \|r(x) + J_k d\|_2^2 \qquad \text{EQ. 2}$$

where $J_k$ is the Jacobian vector, which is equal to $$J_k = \left. \frac{dr}{dx} \right|_{xk},$$

and $r_k = r(x_k)$ which is the sensitivity result. This leads to:

$$r(x_{k+1}) = r(x_k) + J_k(x_k + d) \qquad \text{EQ. 3}$$

The ultimate goal is to get $r(x_{k+1}) = 0$. This leads to $r(x_k) = -J_k(x_k + d)$.

In the exemplary embodiment, the vector $r(x_k)$ is compared to the Jacobian vector $J_k$ to determine the θ (angle) between them. In some embodiments, each vector $J_k$ may have up to 1000 values each, where the number of values in the Jacobian vector depends on the number of sampling points in the event. The θ is calculated by generating the dot product of the vector $r(x_k)$ to the Jacobian vector $J_k$.

$$r(x_k) * J_k = \|r(x_k)\| \|J_k\| \cos\theta \qquad \text{EQ. 4}$$

The resulting θ is compared to a threshold. Parameters with a corresponding θ below the threshold are sent to the pool of parameters that are selected. The ideal θ is zero, but that is generally unachievable. In some embodiments, any parameter with a θ of less than 5° is selected by the parameter identifiability component 312. This threshold is configurable by the user, such as through an interactive user interface. The key idea is that the more orthogonal the angles are between the vectors of J and r, the less likely changes to that parameter moves the response in the desired way. This approach can be extended to a weighted version, by scaling both the measured response and simulated response with a weight vector $w_r$. The weight factor $w_r$ has the same length of the data samples in the event of interest. In this way, given a defined weight factor, it can affect the above calculated angles are between the vectors of J and r. Where r and $J_k$ may be calculated as:

$$r(x_k) = \Sigma_{t=1}^{T} w_p(t) * \left( \frac{y_p^m(t) - y_p(x,t)}{y_p^{base}} \right)^2 + w_q(t) * \left( \frac{y_q^m(t) - y_q(x,t)}{y_q^{base}} \right)^2 \qquad \text{EQ. 5}$$

-continued $$J_k = \frac{r(x_k + \Delta x) - r(x_k)}{\Delta x} \quad \text{EQ. 6}$$

where t represents each point of time in the event, where T is the event time length, and where $w_p(t)$ is a weight vector assigned along the time axis to the active power p, $w_q(t)$ is a weight vector assigned along the time axis to the reactive power q, $y_p^m(t)$ represents the measured active power at time stamp t, $y_p(x,t)$ represents the simulation result at time stamp t with parameter x, $y_p^{base}$ represents the base value of the active power p.

In the exemplary embodiment, the parameter identifiability component 312 receives a plurality of raw parameters x. The parameter identifiability component 312 analyzes each of the parameters using the above equations to determine the θ between the $J_k$ and the $r(x_k)$ for each of the parameters. If the θ meets or is below a predetermined threshold, the parameter identifiability component 312 stores that parameter in a pool of parameters. In the exemplary embodiment, the parameter identifiability component 312 presents the parameters in the pool to the user for approval or adjustment via a interactive user interface.

Once selected or confirmed by the user, the tunable parameters are provided to the tunable parameter estimation component 314. The tunable parameter estimation component 314 adjusts the models based on the tunable parameters selected or confirmed by the user. The parameter estimation component 314 also performs weighted non-linear least squares optimizations for estimating the parameters. The goal is to identify the right parameter to minimize the difference between the $y_t(x)$ and $y_t^m$ so that the estimation matches the measured response.

$$\left| \min_{x_l \le x \le x_u} \sum_{t=1}^{T} w_p(t) * \left( \frac{y_p^m(t) - y_p(x, t)}{y_p^{base}} \right)^2 + \right. \quad \text{EQ. 7}$$

$$w_q(t) * \left( \frac{y_q^m(t) - y_q(x, t)}{y_q^{base}} \right)^2$$

where t represents each point of time in the event, where T is the event time length, and where $w_p(t)$ is a weight vector assigned along the time axis to the active power p, $w_q(t)$ is a weight vector assigned along the time axis to the reactive power q, $y_p^m(t)$ represents the measured active power at time stamp t, $y_p(x,t)$ represents the simulation result at time stamp t with parameter x, $y_p^{base}$ represents the base value of the active power p, which could be 100 MVA for example. $x_l, x_u$ represents the low bound and high bound for parameter x.

In reality, there are around 60~120 parameters for one typical generator simulation model. Tuning all of them given one event is not realistic and not desirable. The industry expects as few as possible of the parameters being tuned given one event or multiple events. One approach is to use the above mentioned sensitivity analysis (or parameter identification) to down select only those parameter subset which lead to high sensitive response change. An alternative approach is to use the sparse optimization by adding a L1 norm as a regularization term in the objective function, and the optimization solver will determine the parameter value while minimizing the number of parameters tuned.

$$\min_{x_l \le x \le x_u} \sum_{t=1}^{T} w_p(t) * \left( \frac{y_p^m(t) - y_p(x, t)}{y_p^{base}} \right)^2 + \quad \text{EQ. 8}$$

$$w_q(t) * \left( \frac{y_q^m(t) - y_q(x, t)}{y_q^{base}} \right)^2 + \alpha \cdot \|x - x_0\|_1$$

where α is how important the tunable parameter is, $x_0$ is the initial parameter, x is the parameter, and $\|x-x_0\|$ is a penalty term. This is considered weighted sparse nonlinear least square optimization.

Figure 4:
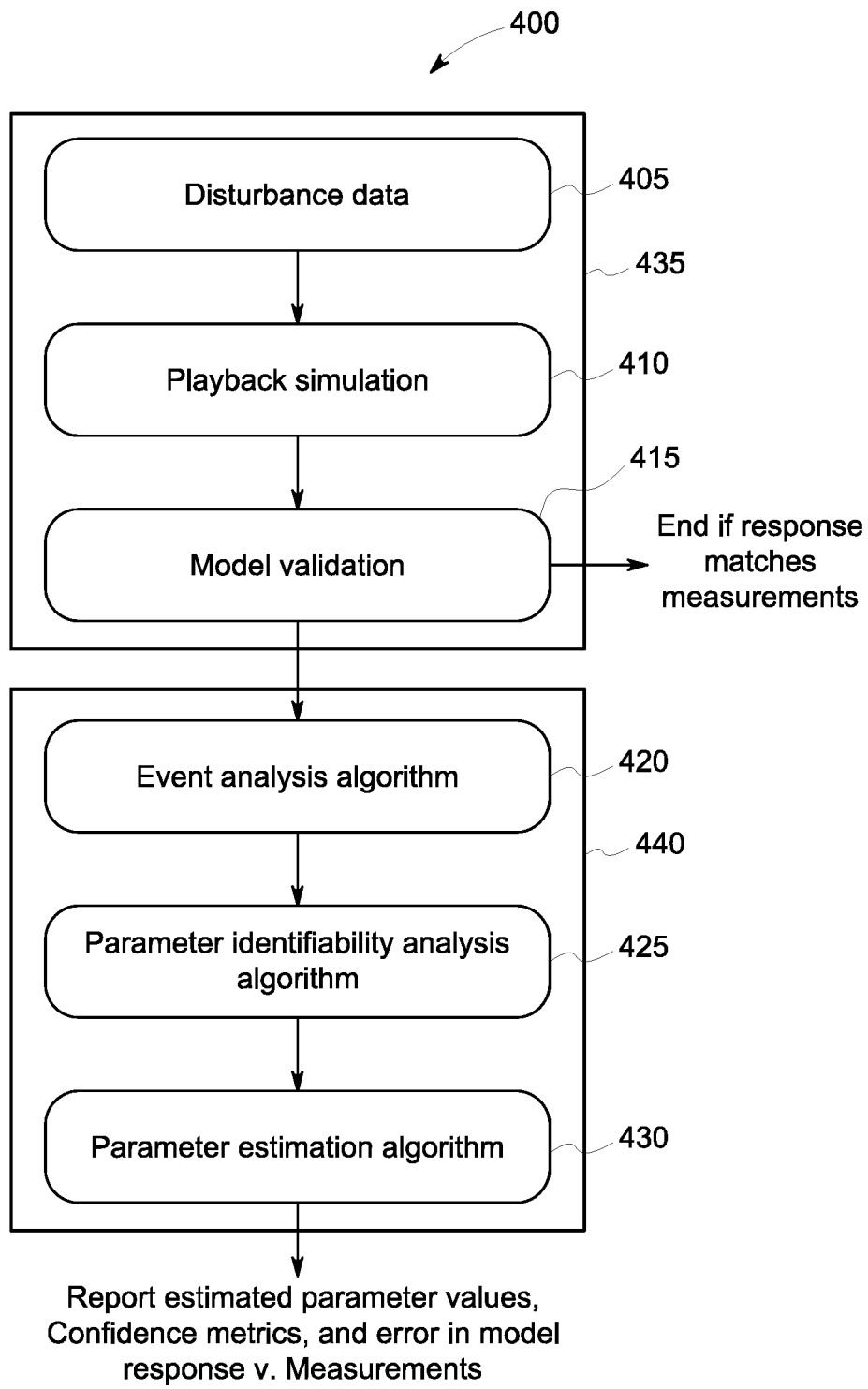
FIG. 4 illustrates a process for power system model parameter conditioning in accordance with some embodiments.

In the exemplary embodiment, the system defines regions or segments (which are portions or time slices of the event) and their corresponding weights (as shown in FIG. 4). The system also allows the user to adjust the regions and weights through the user interface. The user may then assign different weights to each region. For example, a user may assign a first weight for times 0 to 0.3 seconds in the event and a second weight for times 0.3 to 1 second into the event. In addition, the user may define two different weights for the active power curve and the reactive power curve. In some embodiments, the system defines a default weight that is used for sections or regions that do not have user defined weights.

In the exemplary embodiment, the parameter estimation component 314 performs multiple iterations of the calculations until the residual error between the measure values and the estimated values is reduced to below a threshold.

In some embodiments, the user accesses a user interface to set the total number of events 308 that will be analyzed, set the stored file locations, and set the sequence that the events 308 will be analyzed in. The user interface may also be used for other adjustments as described herein.

The feature of an event may include peak value, bottom value, overshoot percentage, rising time, settling time, delay time, peak time, steady state error, phase shift, damping ratio, energy function, cumulative deviation in energy, Fourier transformation spectrum information, frequency response, principal component, minimum volume ellipsoid, and/or steady state gain (P, Q, u, f) of the event. The feature is extracted from the time series of active power, reactive power, voltage, and frequency.

FIG. 4 is a process 400 for power system model parameter conditioning according to some embodiments. At Step 405, disturbance data may be obtained (e.g., from a PMU or DFR) to obtain, for example, V, f, P, and Q measurement data at a Point Of Interest ("POI"). At Step 410, a playback simulation may run load model benchmarking using default model parameters (e.g., associated with a Positive Sequence Load Flow ("PSLF") or Transient Security Assessment Tool ("TSAT")). At Step 415, model validation may compare measurements to default model response. If the response matches the measurements, the framework may end (e.g., the existing model is sufficiently correct and does not need to be updated). At Step 420, an event analysis algorithm may determine if event is qualitatively different from previous events. At Step 425, a parameter identifiability analysis algorithm may determine most identifiable set of parameters across all events of interest. For example, a first event may have 90 to 100 parameters. For that event, Step 425 uses the parameter identifiability algorithm to select 1 to 20 of those parameters.

Finally, at Step 430 an Unscented Kalman Filter ("UKF")/optimization-based parameter estimation algorithm/process may be performed. As a result, the estimated parameter values, confidence metrics, and error in model response (as compared to measurements) may be reported. In some embodiments, Steps 405-415 are considered model validation 435 and Steps 420-430 are considered model calibration

440. As described elsewhere herein, the systems may use one or both of model validation 435 and model calibration 440. In some embodiments, Steps 405-430 are considered a model validation and calibration (MVC) process 400.

Disturbance data may be monitored by one or more PMUs coupled to an electrical power distribution grid may be received. The disturbance data can include voltage ("V"), frequency ("$f$"), and/or active and nonactive reactive ("P" and "Q") power measurements from one or more points of interest (POI) on the electrical power grid. A power system model may include model parameters. These model parameters can be the current parameters incorporated in the power system model. The current parameters can be stored in a model parameter record. Model calibration involves identifying a subset of parameters that can be "tuned" and modifying/adjusting the parameters such that the power system model behaves identically or almost identically to the actual power component being represented by the power system model.

In accordance with some embodiments, the model calibration can implement model calibration with three functionalities. The first functionality is an event screening tool to select characteristics of a disturbance event from a library of recorded event data. This functionality can simulate the power system responses when the power system is subjected to different disturbances. The second functionality is a parameter identifiability study. When implementing this functionality, the can simulate the response(s) of a power system model. The third functionality is simultaneous tuning of models using event data to adjust the identified model parameters. According to various embodiments, the second functionality (parameter identifiability) and the third functionality (tuning of model parameters) may be done using a surrogate model in place of a dynamic simulation engine 316.

Here, the model calibration algorithm attempts to find a parameter value ($\theta^*$) for a parameter (or parameters) of the power system model that creates a matching output between the simulated active power (P) and the simulated reactive power ($\hat{Q}$) predicted by the model with respect to the actual active power (P) and actual reactive power (Q) of the component on the electrical grid.

As grid disturbances occur intermittently, the user of the calibration tool described herein may be required to re-calibrate model parameters in a sequential manner as new disturbances come in. In this scenario, the user has a model that was calibrated to some observed grid disturbances to start with, and observes a larger that acceptable mismatch with a newly encountered disturbance. The task now is to tweak the model parameters so that the model explains the new disturbance without detrimentally affecting the match with earlier disturbances. One solution would be to run calibration simultaneously on all events of interest strung together, but this comes at the cost of significant computational expense and engineering involved in enabling running a batch of events simultaneously. Instead, it may be more preferable to carry some essential information from the earlier calibrations runs and guide the subsequent calibration run that helps explain the new disturbance without losing earlier calibration matches.

Event screening can be implemented during the simulation to provide computational efficiency. If hundreds of events are stitched together and fed into the calibration algorithm unselectively, the algorithm may not be able to converge. To maintain the number of events manageable and still keep an acceptable representation of all the events, a screening procedure may be performed to select the most characteristic events among all. Depending on the type of events, the measurement data could have different characteristics. For example, if an event is a local oscillation, the oscillation frequency in the measurement data would be much faster as compared to an inter-area oscillation event. In some implementations, a K-medoids clustering algorithm can be utilized to group events with similar characteristic together, thus reducing the number of events to be calibrated.

Instead of using the time consuming simulation engine, the surrogate model or models (such as Neural Networks) with equivalent function of dynamic simulation engine, may be used for both identifiability and calibration. The surrogate model may be built offline while there is no request for model calibration. Once built, the surrogate model comprising a set of weights and bias in learned structure of network will be used to predict the active power ($\hat{P}$) and reactive ($\hat{Q}$) given different set of parameters together with time stamped voltage (V) and frequency (f).

The parameter identifiability analysis addresses two aspects: (a) magnitude of sensitivity of output to parameter change; and (b) dependencies among different parameter sensitivities. For example, if the sensitivity magnitude of a particular parameter is low, the parameter would appear in a row being close to zero in the parameter estimation problem's Jacobian matrix. Also, if some of the parameter sensitivities have dependencies, it reflects that there is a linear dependence among the corresponding rows of the Jacobian. Both these scenarios lead to singularity of the Jacobian matrix, making the estimation problem infeasible. Therefore, it may be important to select a subset of parameters which are highly sensitive as well as result in no dependencies among parameter sensitivities. Once the subset of parameters is identified, values in the active power system model for the parameters may be updated, and the system may generate a report and/or display of the estimated parameter values(s), confidence metrics, and the model error response as compared to measured data.

Figure 5:
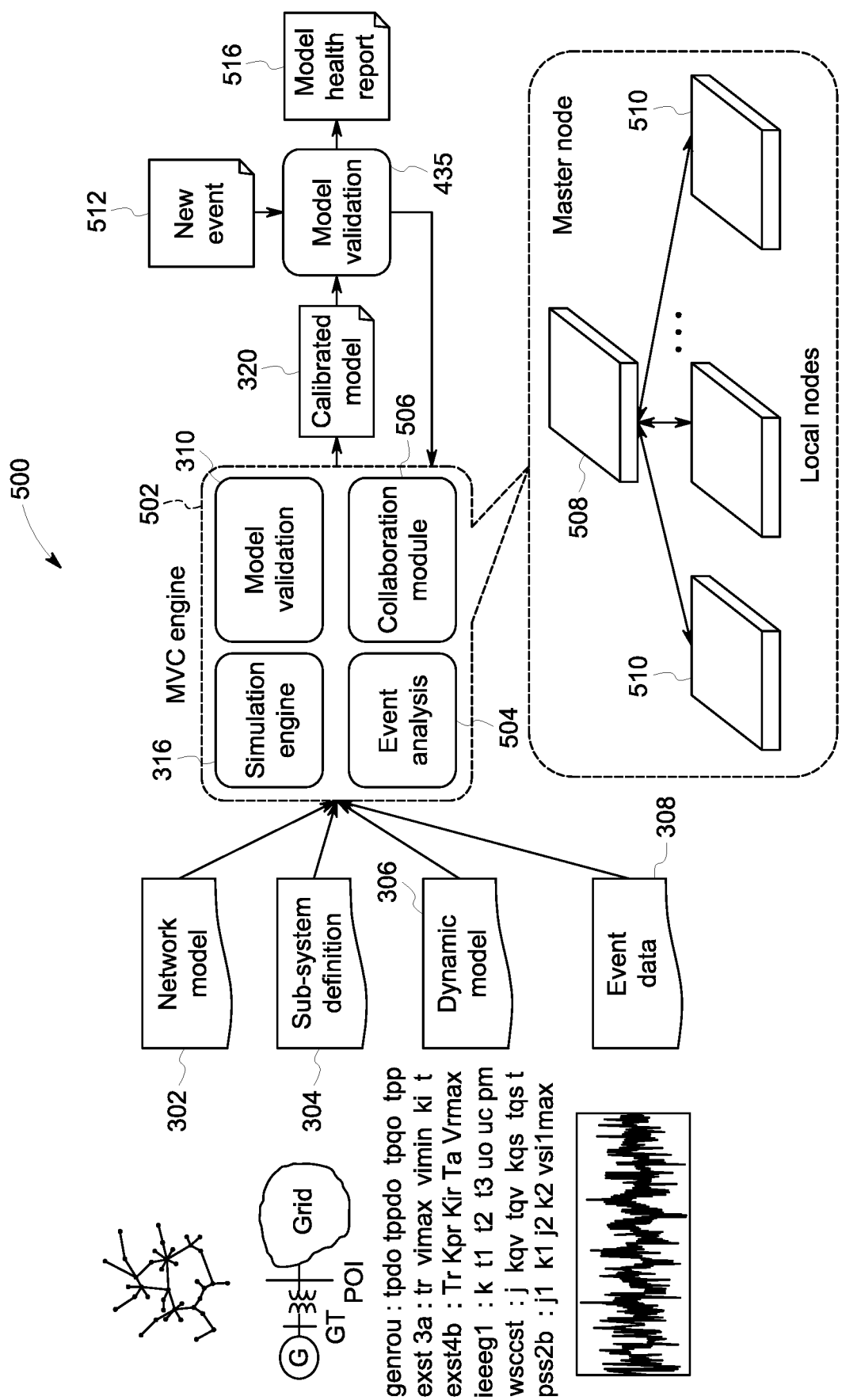
FIG. 5 illustrates a block diagram of exemplary system architecture for distributed power system model calibration, in accordance with one embodiment of the disclosure.

FIG. 5 illustrates a block diagram of exemplary system architecture 500 for distributed power system model calibration, in accordance with one embodiment of the disclosure. In the exemplary embodiment, system architecture 500 is similar to, system architecture 300 (shown in FIG. 3A). In the exemplary embodiment, the system architecture 500 receives network models 302, sub-system definitions 304, dynamic models 306, and event data 308.

In the exemplary embodiment, the system architecture 500 includes a modified MVC engine 502, which may execute similar steps to MVC process 400 (shown in FIG. 4). The modified MVC engine 502 includes the simulation engine 316 and model validation component 310 of system architecture 300. The modified MVC engine 502 also includes an event analysis component 504 and a collaboration module 506. In the exemplary embodiment, the event analysis component 504 categorizes events into a frequency event and/or a voltage event. The event analysis component 504 also performs event subsampling and defines training events, validation events, and testing events. In some embodiments, the event analysis component 504 includes the parameter identifiability component 312 and the tunable parameter estimation component 314 (both shown in FIG. 3A).

The collaboration module 506 allows the modified MVC engine 502 to distribute the processing of analyzing events 308 over multiple computers by using a master node 508 and a plurality of local nodes 510 (also known as client nodes). In the exemplary embodiment, the collaboration module 506 allocates event data 308 into different local nodes 510. The collaboration module 506 receives and aggregates the searched parameter x and integration error u from local nodes 510 and calculates the consensus variable z. The collaboration module 506 conducts model validation across all training events (and validation events if available) to generate the best (optimal) parameter set xb. The master node 508 sends the best parameter set xb and consensus variable z to each local node 510.

In some embodiments, the master node 508 and each local node 510 are separate processor cores. In other embodiments, the master node 508 and the local nodes 510 are virtual machines. In some further embodiments, the master node 508 adds and/or removes virtual machine local nodes 510 based on demand. The described computation parallelism scheme among local nodes 510 may either be multi-thread computation with concurrency at a single computer, and/or heterogeneous computation across a network of computers.

In the exemplary embodiment, the modified MVC engine 502 deploys model validation and calibration tasks in a distributed and collaborative manner using the master-local nodes configurations described herein. The master node 508 allocates and transmits event data 308, system configurations (dynamic model set-up), consensus parameters, best parameter, and penalty gain to the local nodes 510. The local nodes 510 transmit updated search parameters and integration errors to the master node 508 based on the received datasets.

In the exemplary embodiment, the system architecture 500 also includes post processing of the calibrated model 320. After the calibrated model 320 has been generated, the system architecture 500 may receive a new event 512. The system architecture 500 analyzes the event using model validation 435 (shown in FIG. 4). The system architecture 500 generates a model health report 516 based on how the calibrated model 320 performs with the event 512. If the amount of error exceeds a predetermined threshold, then the system architecture 500 adds the new event 512 to the MVC engine 502 to generate an updated calibrated model 320 including the new event 512.

Figure 6:
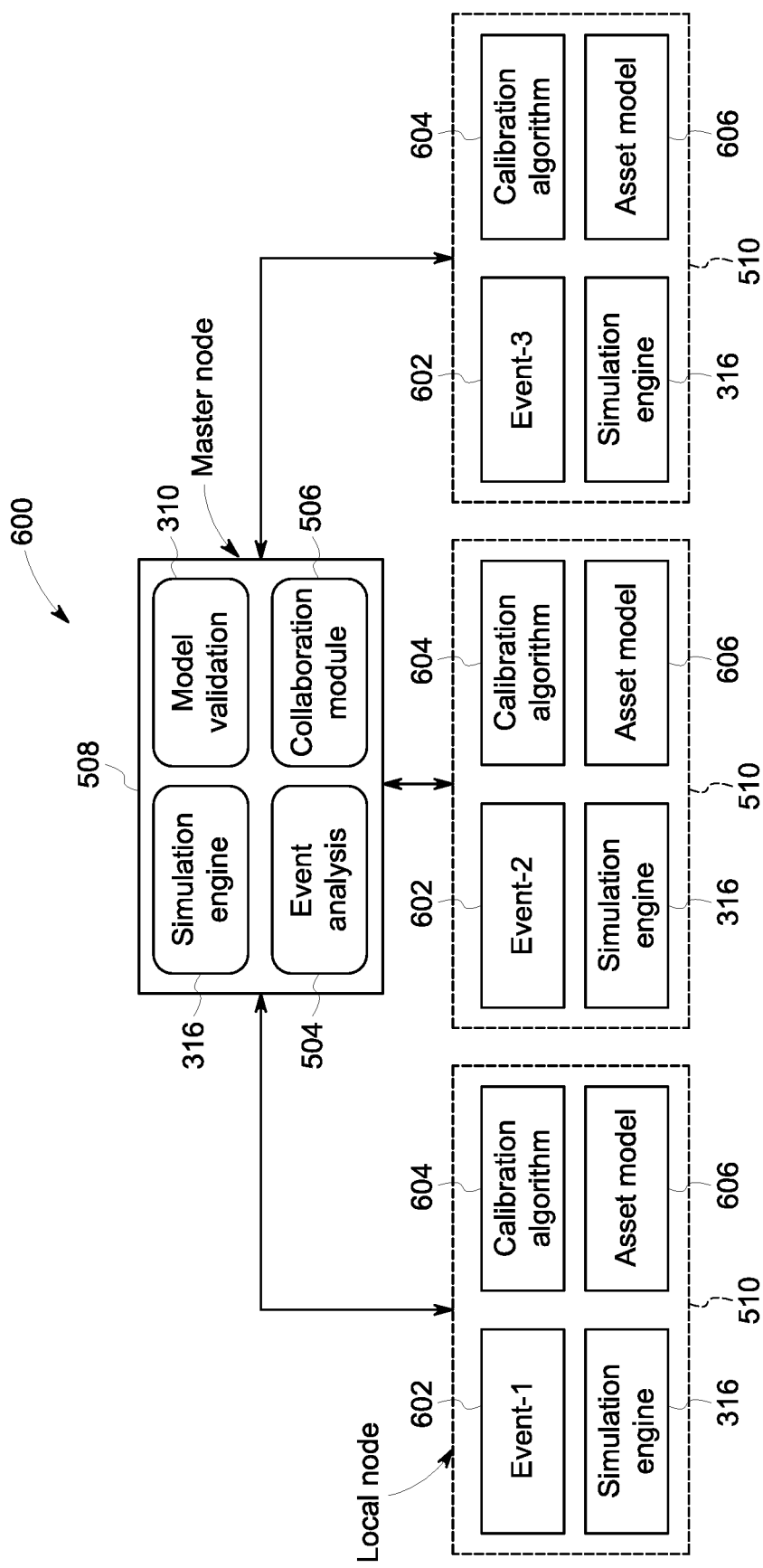
FIG. 6 illustrates a block diagram of the distributed model validation and calibration engine shown in FIG. 5.

FIG. 6 illustrates a block diagram of a first configuration 600 of the distributed model validation and calibration engine 502 (shown in FIG. 5). In configuration 600, the master node 508 is in communication with a plurality of local nodes 510 (also known as client nodes). In the exemplary embodiment, each local node 510 searches for optimal parameters separately and independently. The search parameters are exchanged and aggregated by the master node 508. In some embodiments, the exchange and aggregation is performed at a certain time interval. The master node 508 then distributes the aggregated information to each local node 510 for further search. This process is repeated until a convergence is reached.

In FIG. 6, each local node 510 includes an event 602, a calibration algorithm 604, the simulation engine 316, and an asset model 606. As shown in FIG. 6, each local node 510 includes a different event 602. In the exemplary embodiment, each local node 510 performs the MVC process 400 (shown in FIG. 4) and transmits the results to the master node 508. The master node 508 aggregates those results to update the calibration algorithm 604 and/or the asset model 606 and instructs the local nodes 510 to each re-analyze their event 602 using the updated values.

Figure 7:
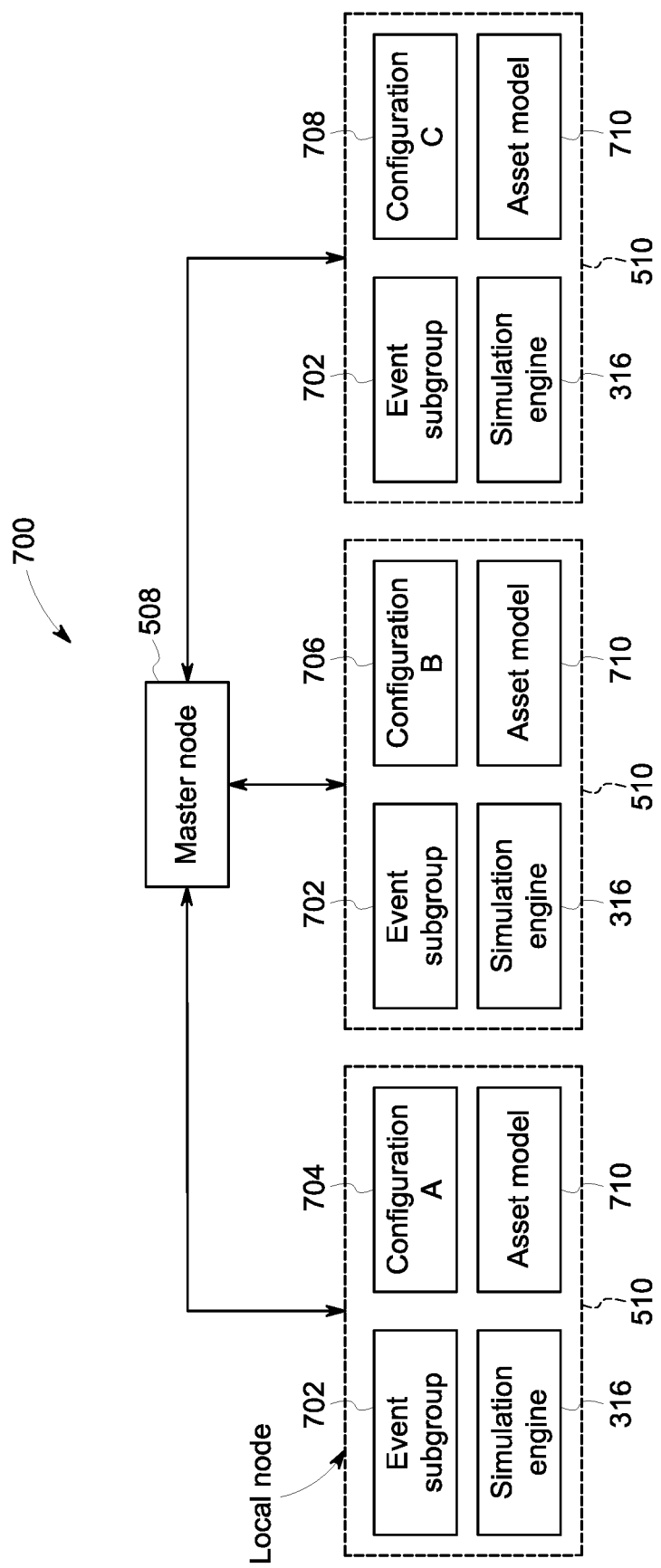
FIG. 7 illustrates another block diagram of the distributed model validation and calibration engine shown in FIG. 5.

FIG. 7 illustrates a block diagram of a second configuration 700 of the distributed model validation and calibration engine 502 (shown in FIG. 5). In FIG. 7, each local node 510 includes an event subgroup 702, a configuration A-C (704-708), the simulation engine 316, and an asset model 710. In the exemplary embodiment, the master node 508 transmits the same set of events (event subgroup 702) to each local node 510, while also transmitting different configurations 704-708 to each local node 510 for analysis. In the exemplary embodiment, each local node 510 performs the MVC process 400 (shown in FIG. 4) and transmits the results to the master node 508. The master node 508 aggregates those results to update the configuration (704-708) and/or the asset model 710 and instructs the local nodes 510 to each re-analyze their event subgroup 702 using the updated values. In other embodiments, configuration 700 is used for validation of individual events or series of events.

In the exemplary embodiment, the local nodes 510 perform parameters screening and parameter estimation. For parameter screening, each local node 510 receives the event subgroup 702 or event 602, asset model file 710, parameter set xb, and consensus variable z. The local node 510 determines the simulation engine 316 type (PSLF or TSAT) based on the asset model file 710. The node 510 conducts parameter identifiability based on event data 702 and parameter xb to generate a subset parameter to be used for parameter estimation. For parameter estimation, each local node 510 tunes the subset parameter based on the consensus variable z and its integration variable u. The tuning algorithm may be a trust-region method or other 2nd order optimization algorithm.

In the exemplary embodiment, the master node 508 allocates the event subgroup 702, the asset model 710, and the configuration 704-708 to each local node 510. The master node 508 receives all the model validation results from each local node 510 and identifies the best configuration which leads to the minimal response error between the simulated response and the measured response. If the best configuration's response is acceptable, then the master node 508 may notify the end user about the best configuration.

Each local node 510 receives the event subgroup 702, asset model file 710, and system configuration 704-708. Using the playback function in the simulation engine 316, each local node 510 generates a response curve and transmits information back to the master node 508. Alternatively, each local node 510 evaluates whether the response is acceptable and only transmits the model quality flag (acceptable/not acceptable) to the master node 508.

In a first example, the configurations A, B, C 704-708 may be governor model disabled only, PSS model disabled only, governor and PSS model both disabled, respectively. The model configuration may be event dependent, as the end user may only disable some portions of the model during a short time interval when an event occurs. In this case, the event subgroup 702 would be a single event and same for all local nodes 510. If configuration A 704 leads to the best accuracy and is acceptable, then the master node 508 may notify the end user that the governor model may be disabled during this event and there is no need for further model calibration to tune the generator model parameter. Meanwhile, the master node 508 may label this event as "governor disabled" before storing it into the database.

Figure 8A:
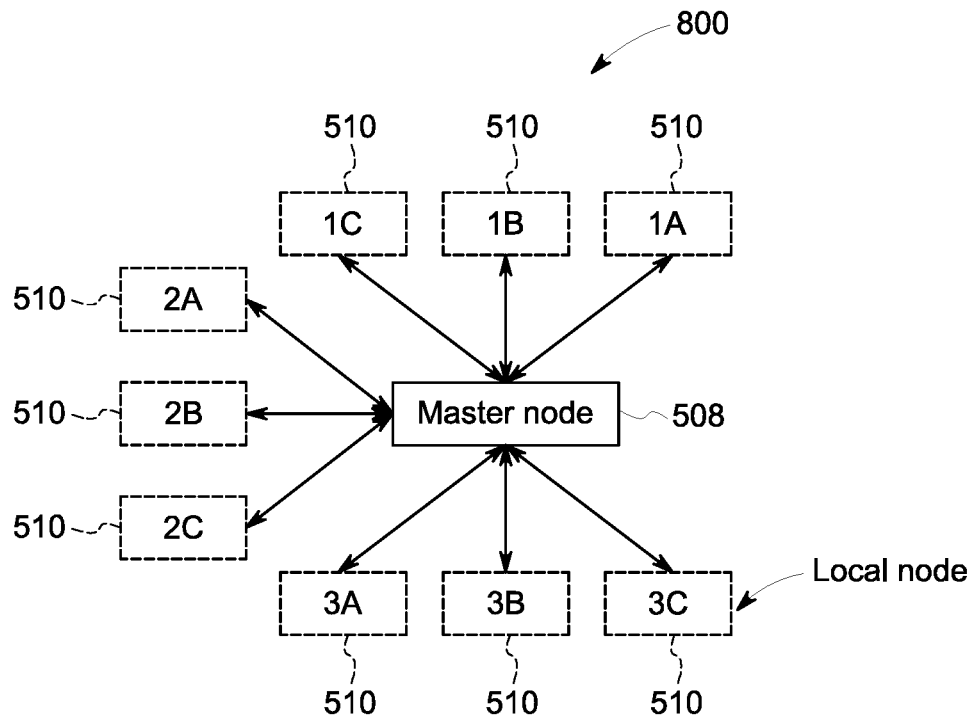
FIGS. 8A and 8B illustrate configurations of the distributed model validation and calibration engine shown in FIGS. 5-7.

In a second example, there are three events (No. 1, 2, 3) that need detailed model validation, where each of them needs to evaluate the configurations A, B, C 704-708 (governor model disabled only, PSS model disabled only, governor and PSS model both disabled). If there are nine local nodes 510 available, then each node 510 may be allocated one combination (e.g. 1A) and nine scenarios may be validated in parallel as shown in FIG. 8A. Taking the local node with scenario 1A for example, the master node may send event 1 602 and Configuration A 704 to this local node, and the local node 510 transmits the playback results to the master node 508 once it is completed.

The number of local nodes available may be limited. If there are only three nodes 510 available, then the system 500 may leverage the three nodes 510 to parallelize the overall model validation task with minimal data transfer. One way to minimize the data transfer from master node 508 to local node 510 is to send only one event to one local node 510. For each local node 510, it may implement three each Configuration A, B, C 704-708 sequentially, as shown in FIG. 8B.

Figure 8B:
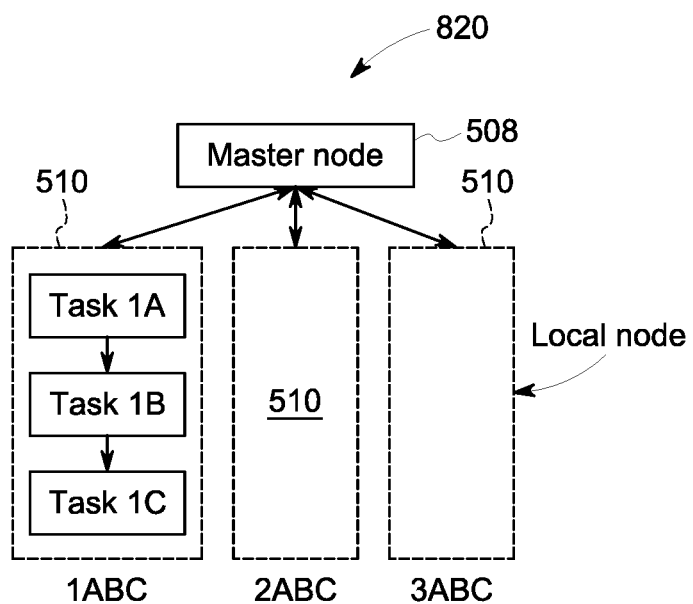

FIGS. 8A and 8B illustrate configurations of the distributed model validation and calibration engine 500, 600, and 700 shown in FIGS. 5-7.

In a first configuration 800, master node 508 is in communication with multiple local nodes 510 (also known as client nodes). In this configuration, each local node is configured to analyze a single event with a single configuration. For example, there are three events (1, 2, and, 3) to be analyzed. There are also three configurations (A, B, and C) to analyze those events with. The configurations may include, but are not limited to governor model disables, PSS disabled, and both governor and PSS disabled. This gives nine combinations or scenarios. In this configuration master node 508 may assign each event and configuration combo to a different local node 510. In this embodiment, the first local node 510 receives event 1 and configuration A from the master node 508. The first local node 510 performs model validation and calibration process 400 (shown in FIG. 4) on the event with that configuration and transmits the results back to the master node 508. Simultaneously, each other local node 510 is also performing the MVC process 400 on its event/configuration combination.

In the second configuration 820 there are a limited number of local nodes 510 available. In this configuration 820, the master node 508 transmits the configurations to each of the local nodes 510. The master node 508 also transmits a single event to each of the local nodes 510 to be analyzed. Each local node 510 performs the MVC process 400 on its event for each of its configurations and reports the results of each to the master node 508. In the exemplary embodiment, each event configuration combination is analyzed individually and the results are reported to the master node 508 independent of the results of the other event configuration combinations. For example, the first local node 510 receives configurations A, B, and C and event 1. The first local node 510 performs the MVC process 400 for each of the three combinations individually and reports the results, while the other local nodes 510 perform the process 400 for other events.

In the exemplary embodiment, the system 500 uses an alternating direction method of multipliers (ADMM) algorithm for processing multiple events in a distributed system. In a situation where there are N events, a parameter vector is x∈Rn, indicating that the parameter vector has n parameter entries. The event is characterized by five time series: time stamp, voltage magnitude, frequency, active power and reactive power. The voltage and frequency signal may be treated as input for the simulation engine, and the active power and reactive power may be treated as the simulation response variable.

For a single event, the model calibration problem can be formulated as a minimization problem with objective function:

$$\min_{x_l \leq x \leq x_u} f_i(x, w) = \sum_{t=1}^{T} w_p(t) * \left(\frac{y_p^m(t) - y_p(x, t)}{y_p^{base}}\right)^2 + w_q(t) * \left(\frac{y_q^m(t) - y_q(x, t)}{y_q^{base}}\right)^2 \quad \text{EQ. 9}$$

where t represents each point of time in the event, where T is the event time length, and where $w_p(t)$ is a weight vector assigned along the time axis to the active power p, $w_q(t)$ is a weight vector assigned along the time axis to the reactive power q. This weight variable allows the user to emphasize a certain segment in the event with abundant transient information. $y_p^m(t)$ represents the measured active power at time stamp t, $y_p(x,t)$ represents the simulation result at time stamp t with parameter x, $y_p^{base}$ represents the base value of the active power p, which could be 100 MVA for example. $x_l, x_u$ represents the low bound and high bound for parameter x.

For multiple events, the model calibration problem is the minimization of the below equation (EQ. 10). The equation keeps $x_0$ as an input variable to highlight the model calibration is a non-convex problem wherein the parameter searching depends on the initial parameter value $x_0$.

$$\min_{x_l \leq x \leq x_u} \Sigma_{i=1}^{N} f_i(x, w, x_0) \quad \text{EQ. 10}$$

This equation may be rewritten as EQ. 11, with the local variable $x_i$, which is associated with the corresponding local node 510, and a consensus variable z. This is a global consensus problem as the constraints ask all local variables to be equal or agree to the consensus variable z. The additional constraints in EQ. 11 turn the non-separable additive objectives in EQ. 10 into separable objectives in EQ. 11, which can be address independently by local nodes.

$$\min_{x_l \leq x \leq x_u} \Sigma_{i=1}^{N} f_i(x_i, w, x_0) \quad \text{EQ. 11}$$

$$s.t. x_i - z = 0, i = 1, 2, \ldots N$$

By applying the ADMM algorithm, the problem can be solved using the below equations:

$$u_i^{k+1} = u_i^k + (x_i^k - z^k) \quad \text{EQ. 12}$$

$$x_i^{k+1} = \mathrm{argmin}\left(f_i(x_i, w, x_0) + (\rho/2)\|x_i - z^k + u_i^{k+1}\|_2^2\right) \quad \text{EQ. 13}$$

$$z^{k+1} = \frac{1}{N}\sum_{i=1}^{N}(x_i^{k+1} + u_i^{k+1}) = \bar{x}^{k+1} + \bar{u}^{k+1} \quad \text{EQ. 14}$$

where k represents the iteration step in the ADMM algorithm, i refers to the index of each local node. $u_i$ represents the integration error or running sum of errors. $\bar{x}^{k+1}$ is the average value of all local variables searched from each local node. $\bar{u}^{k+1}$ is the average value of all integration error from each local node. And ρ is the penalty gain.

From the perspective of the local nodes 510, each local node i 510 receives z, updates $u_i$ and $x_i$, and transmits them to the central collector, aka master node 508. The local node i 510, waits and then receives updated z from the master node 508.

From the global perspective, the central collector 508 broadcasts z to the local nodes 510, waits for them to finish local processing, gathers all the $x_i$ and $u_i$, and updates z. If ρ varies across iterations, then ρ is also updated and broadcast when z is updated.

Figure 9:
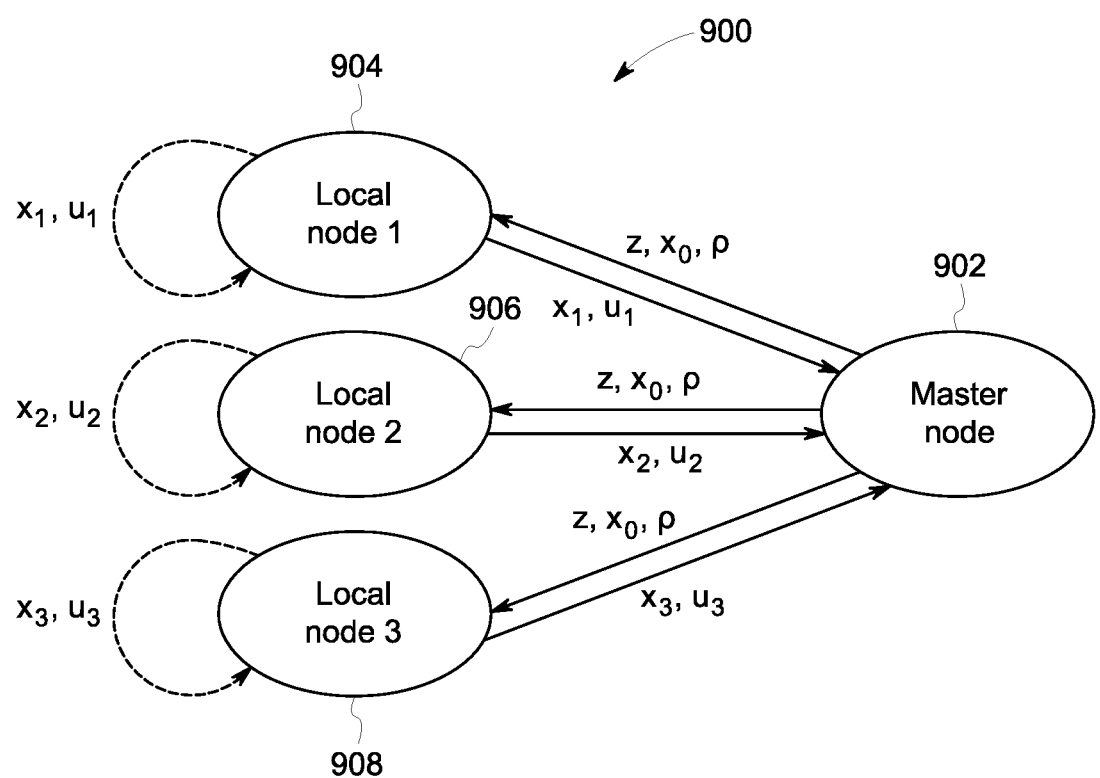
FIG. 9 illustrates a system for distributed model calibration in accordance with at least one embodiment of the disclosure.

This process is illustrated in FIG. 9. FIG. 9 illustrates a system 900 for distributed model calibration in accordance with at least one embodiment of the disclosure. System 900 may be similar to systems 600 and 700 (shown in FIGS. 6 and 7). System 900 includes a master node 902, which may be similar to master node 508 (shown in FIG. 5) and a plurality of local nodes 904-908, which may be similar to local node 510 (shown in FIG. 5).

Master node 902 transmits z, $x_o$, and ρ to each of the local nodes 904-908, where each of the local nodes 904-908 is associated with an event 602 (shown in FIG. 6) and/or a configuration 704 (shown in FIG. 7). Local nodes 1-3 904-908 each receive z, xo, and ρ. Local node 1 904 performs the model validation and calibration process to generate $x_1$ and $u_1$. The dotted line for local node 1 904 indicates the generation of $x_1$ and $u_1$ is another local iterative process with convex or non-convex optimization algorithm. For example, this may include, but is not limited to, the steep descent method, conjugate gradient method, Newton method, pseudo-Newton method, trust region reflection method, active set method. There are also options to solve the problem using any optimization algorithm such as, but not limited to, point method, Nelder-Mead simplex method, nonlinear programming, probability programming, global nonlinear programming, genetic algorithm, and particle swarm technology. Correspondingly, local node 2 906 performs the model validation and calibration process to generate $x_2$ and $u_2$, while local node 3 908 performs the model validation and calibration process to generate $x_3$ and $u_3$. Each of the local nodes 904-908 transmits their x and u to the master node 902, which collects the $x_i$s and $u_i$s to update z. In some embodiments, the master node 902 transmits the updated z and the cycle continues until a stopping criteria is reached.

In the exemplary embodiment, the ADMM processing performed by the master node 902 is as follows. Initialize k=0, x=$x_0$, set the number of total event, training event index $i_{trn}$ validation event index $i_{val}$, and max iteration number. Transmit event and configuration information and initial values $x_0$ to all N nodes. Then the cyclical process begins with waiting until update received from all N nodes. Update $z^{k+1}$ using Equation 14. Update $x_0^{k+1}$ by model validation across the training events. Update $\rho^{k+1}$ by a heuristic algorithm. The heuristic algorithm is used to determine the number of iterations for the local trust region algorithm and the number of iteration of the ADMM outer loop. Broadcast $x_0^{k+1}$, $z^{k+1}$, and $\rho^{k+1}$ to all local nodes 904-908. Increment k by 1. Repeat until termination and then output the best solution—$x_{best}^{1:k}$.

One example of the heuristic algorithm to adjust the penalty gain is to try to keep the primal and dual residual norms within a factor of μ of one another as they both converge to zero. Set primal residual norm as $r^k=x^k-z^k$ and dual residual as $s^k=\rho(z^k-z^{k-1})$. Then the adjustment scheme inflates ρ by $\tau^I$ time when the primal residual appears large compared to the dual residual, and deflates ρ by $\tau^D$ when the primal residual seems too small relative to the dual residual. Specifically, the adjustment scheme inflates ρ by $\tau^I$ time when the ratio of the primal residual norm over dual residual norm is larger than μ, and deflates p by $\tau^D$ when the ratio of the dual residual norm over primal residual norm is larger than μ. An example of μ may be 10 or 5, and it is common to set $\tau^D=\tau^I=2$.

Another example of the heuristic algorithm to determine the number of the iteration or stopping criteria is to examine the primal residual and dual residual against their individual thresholds. Specifically, the ADMM will automatically stop if $\|r^k\|_2 \leq \epsilon^r$ and $\|s^k\|_2 \leq \epsilon^s$. An example of $\epsilon^r$ and $\epsilon^s$ is given in below:

$$\epsilon^r = \sqrt{N \cdot p} \cdot \epsilon^{abs} + \epsilon^{rel} \cdot \max(\|x^k\|_2, \|z^k\|_2) \quad \text{EQ. 15}$$

$$\epsilon^s = \sqrt{N p} \cdot \epsilon^{abs} + \epsilon^{rel} \cdot \|\rho \cdot u^k\|_2 \quad \text{EQ. 16}$$

where N is the total number of events, p is the number of variables to be solved; $\epsilon^{abs}$ and $\epsilon^{rel}$ can be chosen in the range of $10^{-4}$ and $10^{-2}$.

In the exemplary embodiment, the ADMM processing performed by the local nodes 904-908 is as follows. Initialize k=0, p=0, total and training event index $i_{trn}$. Receive initial values from master node 902. Then the cyclical process begins with determine the parameter subset. Update $u_i^{k+1}$ using Equation 12. Update $x_i^{k+1}$ using Equation 13. In some embodiments, this is based on a trust-region method. Send $u_i^{k+1}$ and $x_i^{k+1}$ to master node 902. Wait until receiving updated $x_0^{k+1}$, $z^{k+1}$, and $\rho^{k+1}$. Repeat process until termination.

While ADMM is described above, one having skill in the art would understand that other distributed algorithms may be used including, but not limited to, proximal algorithm, alternating minimization algorithm (AMA), fast AMA, fast ADMM, and over-relax ADMM.

Figure 10:
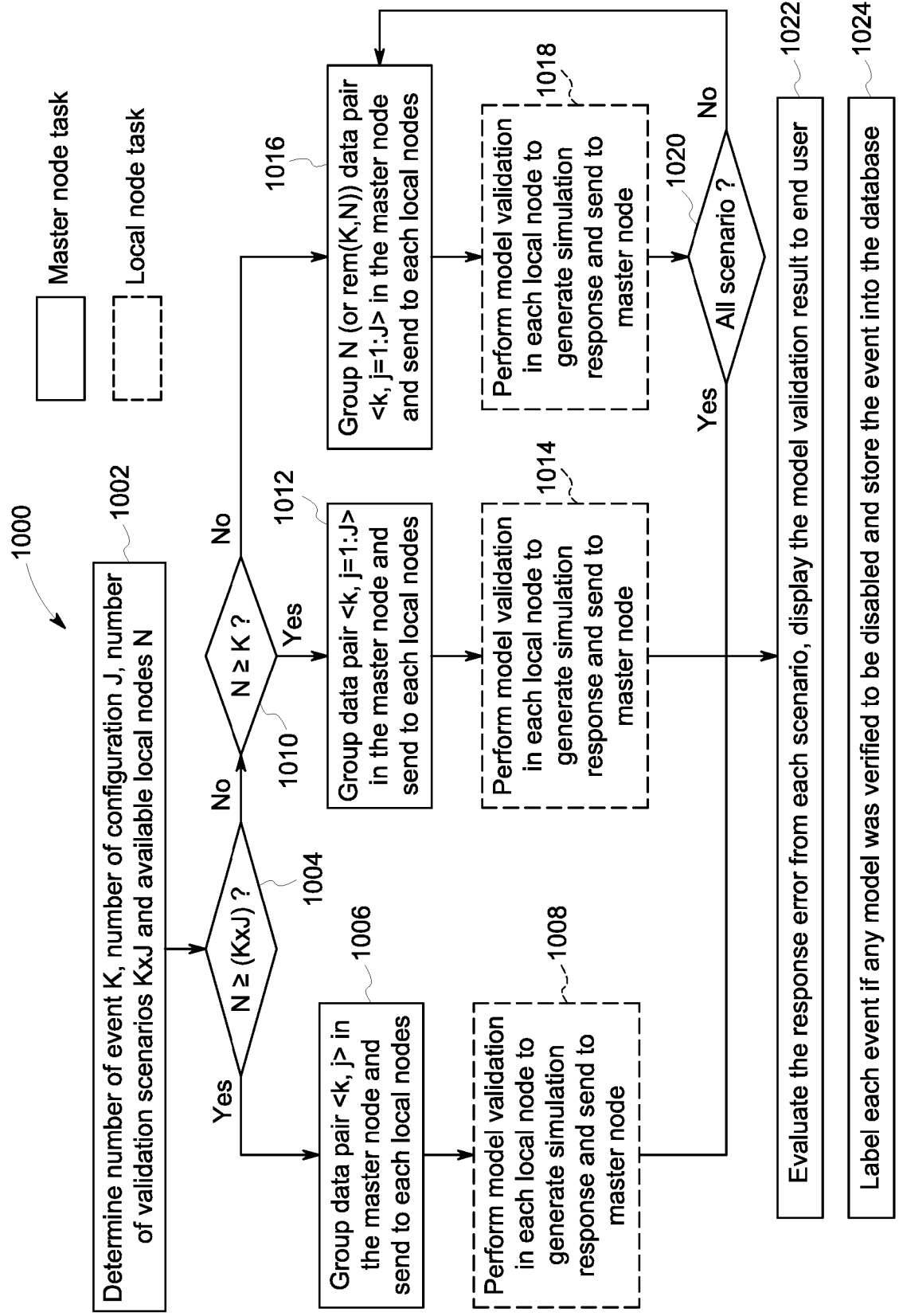
FIG. 10 illustrates a process for distributed model validation in accordance with one embodiment of the disclosure.

FIG. 10 illustrates a process 1000 for distributed model validation in accordance with one embodiment of the disclosure. In the exemplary embodiment, process 100 is performed by the modified MVC engine 502 (shown in FIG. 5), with some steps being performed by the master node 508 and some steps being performed by the local nodes 510 (both shown in FIG. 5).

In the exemplary embodiment, the master node 508 determines 1002 a number of events K, a number of configurations J, a number of validation scenarios K*J, and a number of available local nodes 510 N. The modified MVC engine 502 determines 1004 if the number of local nodes 510 (N) is greater than or equal to the number of scenarios (K*J). If N is greater than or equal to K*J, then the master node 508 groups 1006 data pairs <k, j> and then sends one data pair to each available local node 510 as shown in step 1006. The data pair <k, j> indicate the event k and model configuration j. In step 1008, each local node 510 performs 1008 model validation 435 (shown in FIG. 4) on the data pair to generate a simulation response. The local node 510 transmits the simulation response to the master node 508. In the exemplary embodiment, this uses configuration 800 (shown in FIG. 8A).

If the number of available nodes N is less than the number of scenarios, then the master node 508 determines 1010 if the number of nodes is greater than the number of events K. If N is greater than or equal to K, then the master node 508 groups 1012 data pairs <k, j=1:J> and transmits each data pair to a corresponding local node 510. Data pairs <k, j=1:J> represents one event k with all J model configurations. In other words, the master node transmits a single event together with all of the configurations to each local node 510. Each local node 510 performs 1014 model validation 435 on the event using each configuration and transmits the corresponding simulation responses to the master node 508. In the exemplary embodiment, this uses configuration 820 (shown in FIG. 8B).

If the number of nodes N is less than the number of events K, the master node 508 groups 1016 N data pairs, or the remainder of (K, N) data pairs, <k, j=1:J> and sends one data pair to each of the local nodes 510. In other words, the master node transmits a single event and all of the configurations to each local node 510. Each local node 510 performs 1018 model validation 435 on the event using each configuration and transmits the corresponding simulation responses to the master node 508. The master node 508 determines 1020 if all scenarios have been analyzed. If not, then Steps 1016 and 1018 repeat. In the exemplary embodiment, this uses configuration 820 (shown in FIG. 8B).

When all of the scenarios have been analyzed using any of the available paths, the master node 508 evaluates 1022 the response error from each of the scenarios. In some embodiments, the master node 508 displays the model validation results to the user. The master node 508 labels 1024 each event if any model was verified to be disabled and stores the event in the database.

The benefit of the scheme illustrated in FIG. 10 comprises of faster model validation process with a reduce amount of data transmission between the master node and local node.

Figure 11:
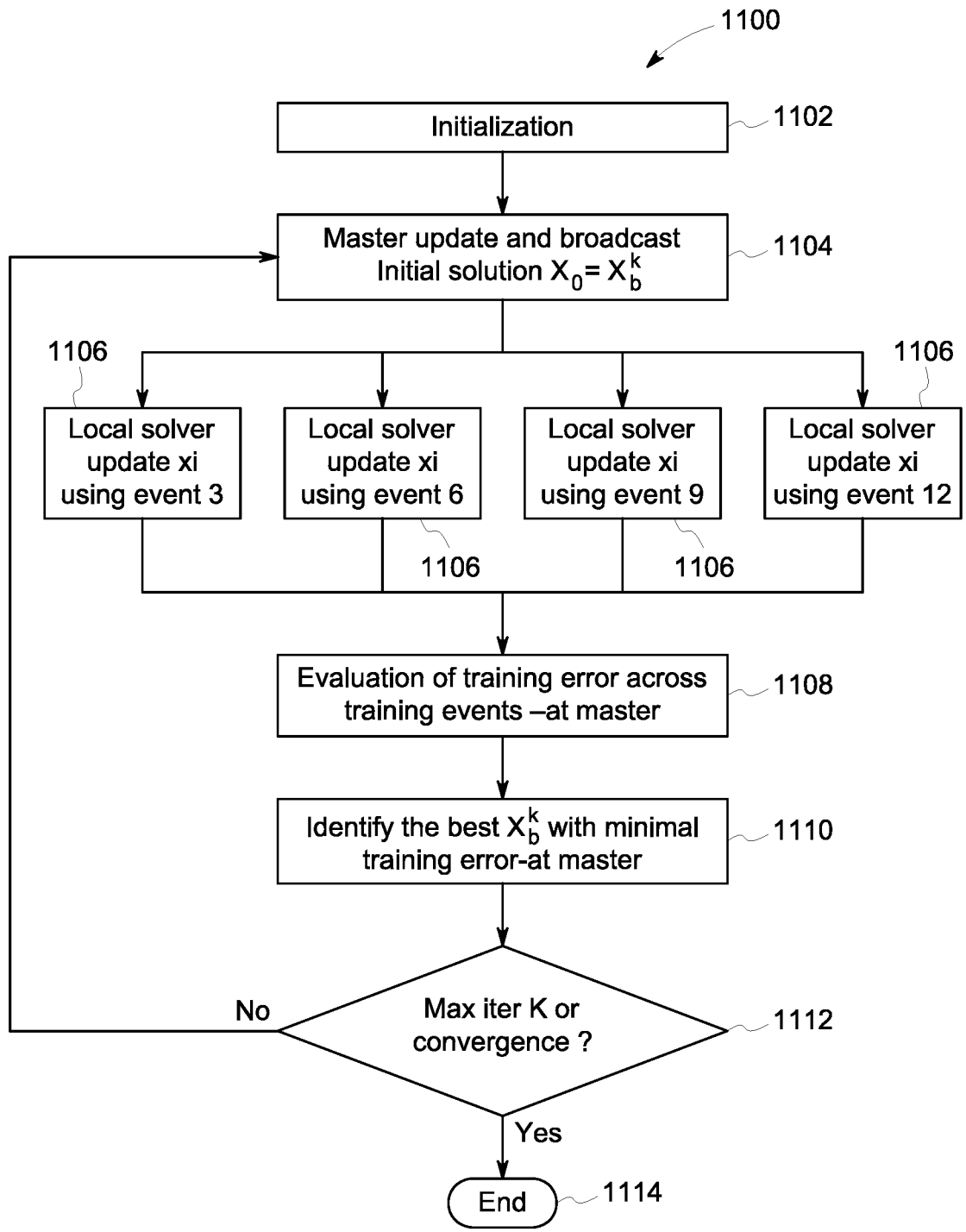
FIG. 11 illustrates a process for distributed model calibration using deterministic elitism without consensus using the system shown in FIG. 5.

FIG. 11 illustrates a process 1100 for distributed model calibration using deterministic elitism without consensus using the system 500 (shown in FIG. 5). For the purposes of this discussion, elitism includes copying a small proportion of the fittest candidates, unchanged, into the next generation. This can sometimes have a dramatic impact on performance by ensuring that the search algorithm does not waste time re-discovering previously discarded partial solutions. Candidate solutions that are preserved unchanged through elitism remain eligible for selection as parents when breeding the remainder of the next generation (i.e., "remember the best solution found").

In the exemplary embodiment, the penalty gain is set as zero. This means no consensus constraint is exerted on each local node when they do their individual parameter search.

Each local solver minimizes the residual defined for curve or feature matching based on the same initial value $X_0$ and the different event. Each local solver identifies the local solution using below equation, note that the $X_0$ in the function highlights the dependence of local solution on the initial value $X_0$ for non-convex problem.

$$x_i^{k+1} = \arg\min_{x_i} f_i(X_i, X_0, w) \quad \text{EQ. 15}$$

In one embodiment, the best solution $X_b^k$ across all solvers may be identified based on minimal training error across the four events 3, 6, 9, 12. An alternative embodiment, another set of events is allocated, aka validation set. In that case, the solution which leads to minimal error on both training and validation set may be selected as the best solution. By using the "elitism" idea, the convergence may speed up. The best solution will be redistributed as initial value of the next iteration in the outer loop.

The terminating condition may be maximal number of iteration, or other convergence criteria. One example is check the error between X or residual for consecutive iteration below a threshold. Another example is an "early stopping technique" widely used in neural net training. In this example when the validation error increases for a specified number of iterations, the training is stopped, and the parameter with the minimum of the validation error is returned.

In the exemplary embodiment, the system 500 initializes 1102 the process 1100. The master node 508 (shown in FIG. 5) updates and broadcasts 1104 the initial solution $X_0=X_b^k$ to the local nodes 510 (shown in FIG. 5). Each local node 510 receives a different event and performs the calibration process 440 (shown in FIG. 4) to update 1106 $x_i$ for that event. The results are transmitted to the master node 508 which evaluates 1108 the training error across all of the training events. The master node 508 identifies 1110 the best $X_b^k$ with the minimal training error. The master node 508 determines 1112 if the termination condition has been reached, such as maximum iteration K or algorithm convergence. If the determination is no, then the master node 508 returns to Step 1102. Otherwise, the process 1100 ends 1114.

The approach shown in process 1100 has more explorative capability since there is no consensus constraint during each local search. The elite preserving scheme allows the new search in each iteration start from the best solution identified so far, which makes it have a faster convergence.

Figure 12:
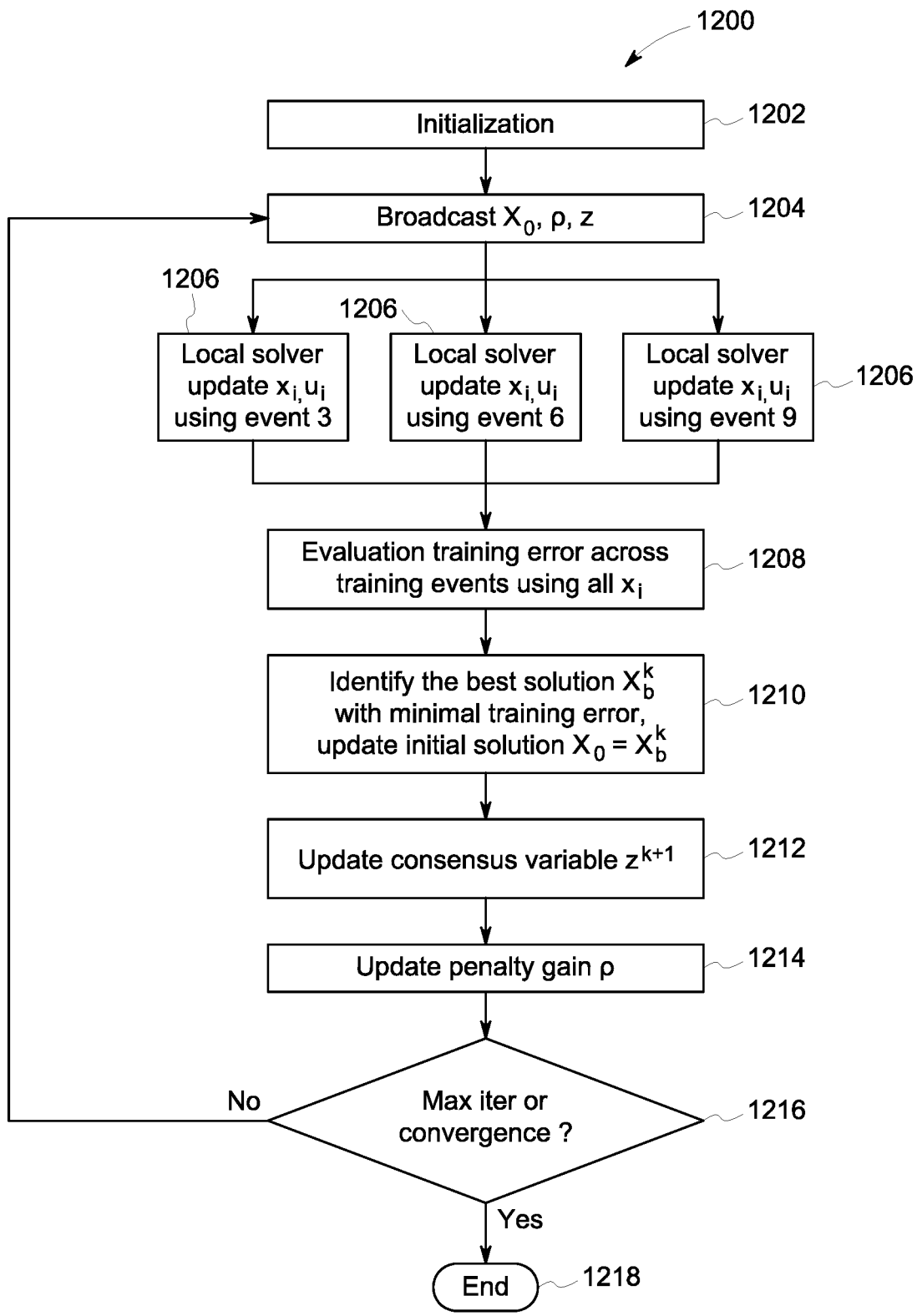
FIG. 12 illustrates a process for distributed model calibration using deterministic elitism with consensus using the system shown in FIG. 5.

FIG. 12 illustrates a process 1200 for distributed model calibration using deterministic elitism with consensus using the system 500 (shown in FIG. 5).

Process 1200 includes a similar strategy as process 1100 (shown in FIG. 11), the key difference is that consensus is enabled. For each iteration, the mean solution across all local solutions is obtained which indicates an information exchange or recombination using the offspring of previous generation. Note the terms generation and iteration are used here interchangeably. Then for each local solution, its accumulated error with mean solution is calculated, which is similar as the integration in the PID control. Then the mean solution and the integration error pass to the next generation in the penalty term. For the next iteration, each local solver identifies the new offspring or solution via the below equation, which is consensus optimization considering both raw fitness function $f(x)$ and also the consensus term with a penalty gain $\rho$.

$$X_i^{k+1} = \arg\min_{X_i}\left(f_i(X_i, X_0, w) + \left(\frac{\rho}{2}\right)\left\|X_i - \overline{X}^k + U_i^k\right\|_2^2\right) \quad \text{EQ. 16}$$

In the exemplary embodiment, the system 500 initializes 1202 the process 1200. The master node 508 (shown in FIG. 5) broadcasts 1204 $X_0$, $\rho$, and z to the local nodes 510 (shown in FIG. 5). Each local node 510 receives a different event and performs the calibration process 440 (shown in FIG. 4) to update 1206 $x_i$ and $u_i$ for that event. The results are transmitted to the master node 508 which evaluates 1208 the training error across all of the training events using all of the $x_1$. The master node 508 identifies 1210 the best $X_b^k$ with the minimal training error and updates the initial solution $X_0=X_b^k$. The master node 508 updates 1212 the consensus variable $z^{k+1}$ using Equation 14. The master node 508 updates 1214 the penalty gain $\rho$. The master node 508 determines 1216 if the termination condition has been reached, such as maximum number of iterations or convergence. If the determination is no, then the master node 508 returns to Step 1204. Otherwise, the process 1200 ends 1218.

The approach shown in process 1200 has more exploitative capability as the consensus constraint in each local search favors the exploitation around the initial value. The elite preserving scheme allows the new search in each iteration start from the best solution identified so far, which provides it with a faster convergence.

Figure 13:
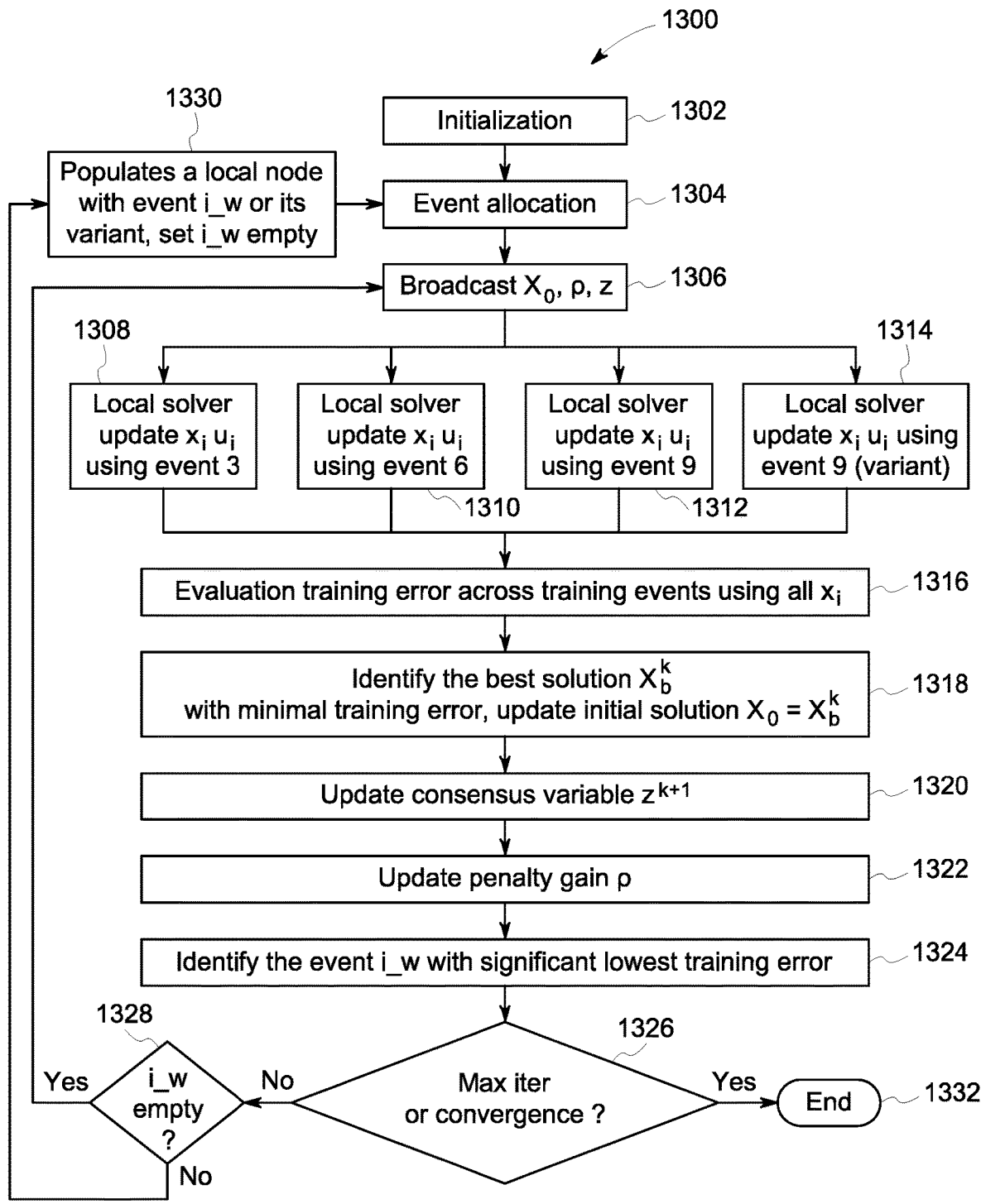
FIG. 13 illustrates another process for distributed model calibration using deterministic elitism with consensus using the system shown in FIG. 5.

FIG. 13 illustrates another process 1300 for distributed model calibration using deterministic elitism with consensus using the system 500 (shown in FIG. 5).

Process 1300 includes a similar strategy as process 1200, the key difference to dynamically increase or decrease a local node based on the statistics of the training error. An event i_w may be identified if it has the significant lowest training error over a certain iterations. This indicates that this event is difficult for the model to learn and thus requires more attention. One way to alleviate this situation is to increase its weight during weighted average at master node.

Figure 14:
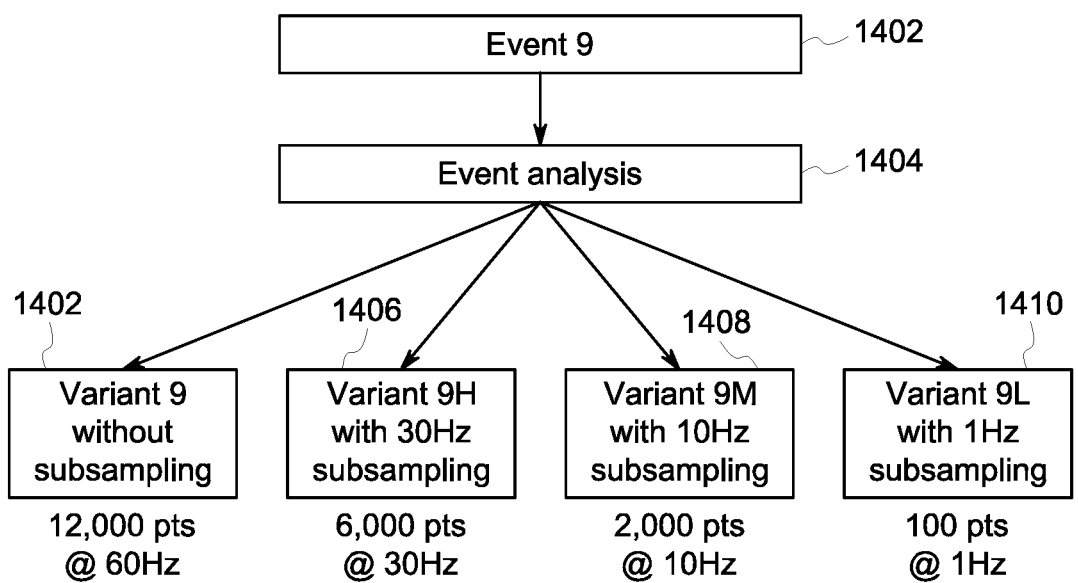
FIG. 14 illustrates a block diagram for generating variants of events for the process shown in FIG. 13.

Another method, which is shown in FIG. 14, to alleviate this situation is to add a local node 510 (shown in FIG. 5) and make a copy of the event i_w or its variant. A variant of an event may be created during event analysis at the master node 508 (shown in FIG. 5), based on different sampling rate. For example, the original Event 9 data series 1402 may have 12,000 data points with 60 Hz sampling rate. Using the event analysis component 1404, Event 9 data series 1402 is down sampled to generate three variants 1406-1410 based on sampling rate of 30 Hz, 10 Hz and 1 Hz, which leads to event variant with 6000, 2000 and 100 data points, respectively. Each event variant 1406-1410 may capture the event at different time scale. By default, the system 500 may use the variant 9M 1408 to ensure the event data length at 2000 pts to make the memory management task easier. The multi-scale event variant may help improve the model fitting result.

In the exemplary embodiment, the system 500 initializes 1302 the process 1300. The master node 508 allocates 1304 the events. Then the master node 508 broadcasts 1306 $X_0$, $\rho$, and z to the local nodes 510. Each local node 510 receives a different event and performs the calibration process 440 (shown in FIG. 4) to update 1308-1314 $x_i$ and $u_i$ for that event. In some embodiments, some of the local nodes 510 receive variants of events, where the variants may be sub-sampled or down sampled versions of the event, as described above. The results are transmitted to the master node 508 which evaluates 1316 the training error across all of the training events using all of the $x_i$. The master node 508 identifies 1318 the best $X_b^k$ with the minimal training error and updates the initial solution $X_0 = X_h^k$. The master node 508 updates 1320 the consensus variable $z^{k+1}$ using Equation 14. The master node 508 updates 1322 the penalty gain $\rho$. The master node 508 identifies 1324 the event i_w with the significant lowest training error. The master node 508 determines 1326 if the termination condition has been reached, such as maximum number of iterations or convergence. If the determination is no, then the master node 508 determines 1328 if i_w is empty. If yes, then process 1300 returns to Step 1306. If no, then the master node 508 populates 1330 a local node 510 with event i_w or its variant as a part of event allocation 1304 and sets i_w to empty. Then process 1300 continues to event allocation 1304. If the determination is that the termination condition has been reached, the process 1300 ends 1332.

In another embodiment, the system 500 performs the deterministic elitism with consensus process 1200 and 1300 followed by the deterministic elitism without consensus process 1100. This is based from the tradeoff between exploration and exploitation for model parameter search problem. The consensus optimization has great convergence property with mild accuracy. By using it during the first part may encourage more exploration. Then by removing consensus but keeping elitism brings "greedy search" with more focus on exploitation. This framework may be verified with better accuracy without incurring too much time cost.

Figure 15:
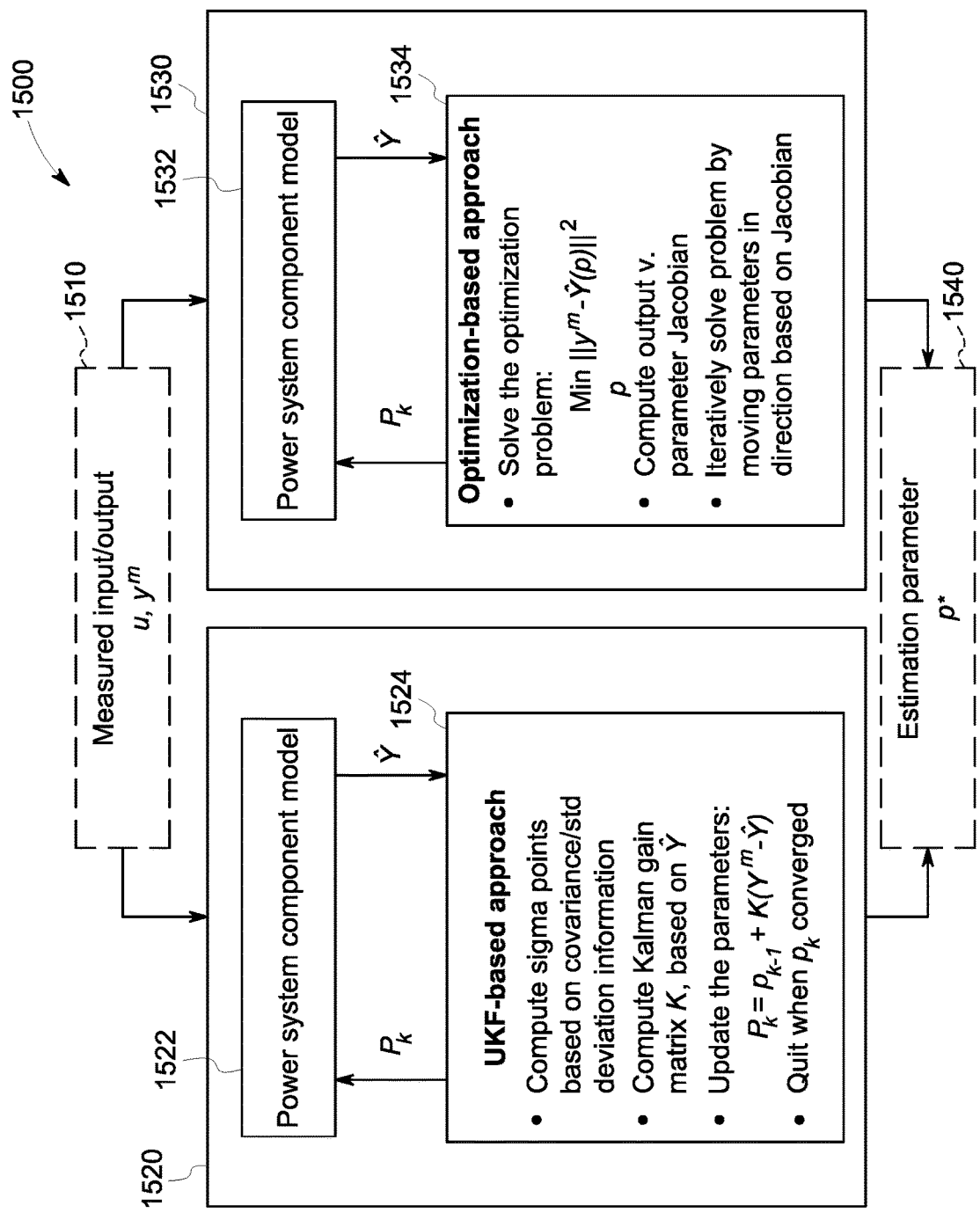
FIG. 15 is a diagram illustrating candidate parameter estimation algorithms in accordance with some embodiments.

FIG. 15 illustrates candidate parameter estimation algorithms 1500 according to some embodiments. In one approach 1520, measured input/output data 1510 (u, $y^m$) may be used by a power system component model 1522 and an UKF based approach 1524 to create an estimation parameter (p*) 1540.

In particular, the system may compute sigma points based on covariance and standard deviation information. The Kalman Gain matrix K may be computed based on $\hat{Y}$ and the parameters may be updated based on:

$$p_k = p_{k-1} + K(y^m - \hat{y})$$

until $p_k$ converges. According to another approach 1530, the measured input/output data 1510 (u, $y^m$) may be used by a power system component model 1532 and an optimization-based approach 1534 to create the estimation parameter (p*) 1540. In this case, the following optimization problem may be solved:

$$\min_p \|y^m - \hat{Y}(p)\|^2$$

The system may then compute output as compared to parameter Jacobian information and iteratively solve the above optimization problem by moving parameters in directions indicated by the Jacobian information.

Figure 16:
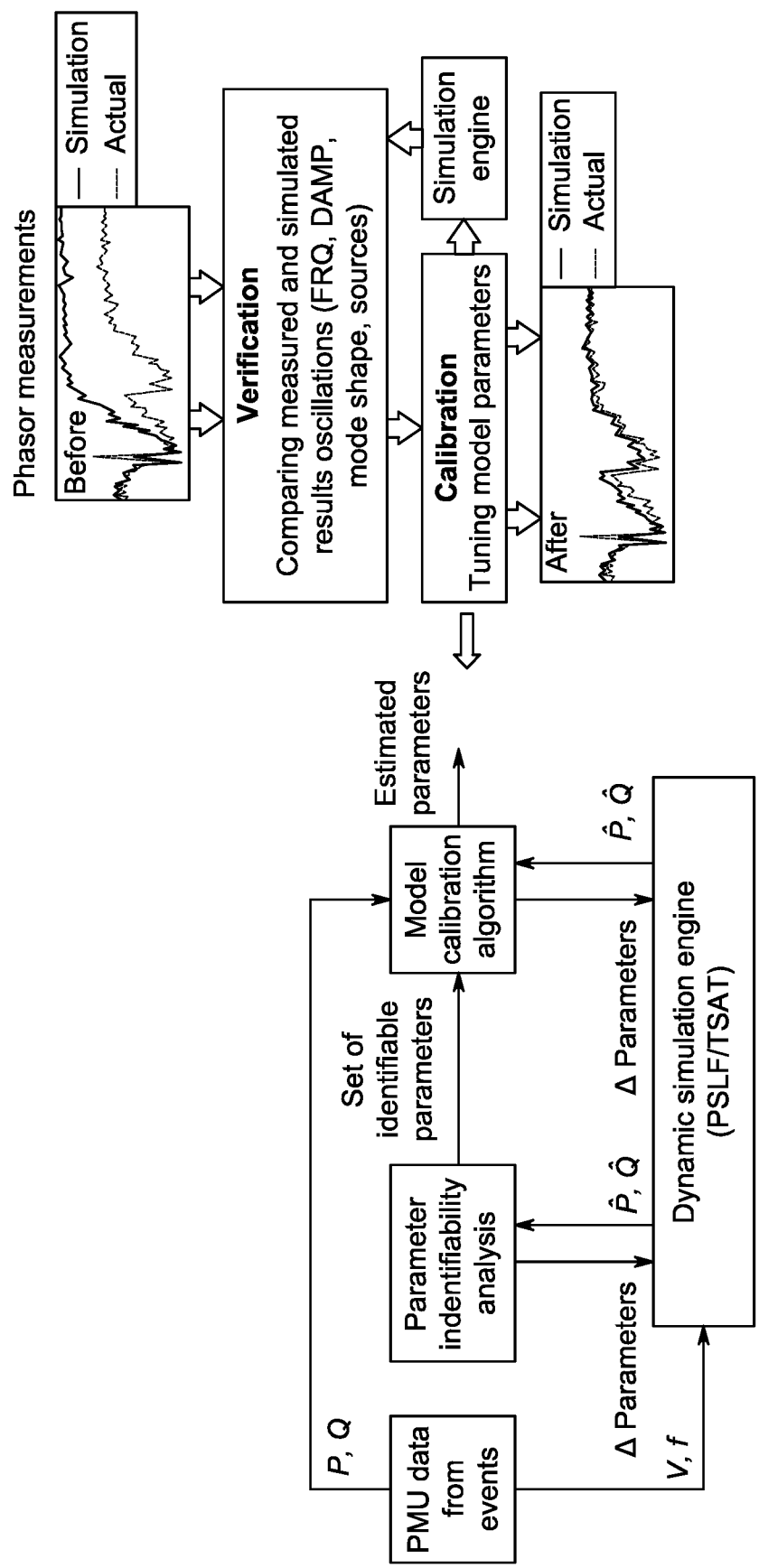
FIG. 16 illustrates a two-stage approach of the process for model calibration.

FIG. 16 illustrates a two-stage approach of the process for model calibration. In this approach, PMU data from events is fed into a dynamic simulation engine. The dynamic simulation engine communicates with a parameter identifiability analysis component and returns the changes to the parameters. The parameter identifiability analysis component also transmits a set of identifiable parameters to a model calibration algorithm component. The model calibration algorithm component uses the set of identifiable parameters, PMU data from events, and other data from the dynamic simulation engine to generate estimated parameters. This approach may be used to calibrate the tuning model parameters.

With the playback simulation capability, the user can compare the response (active power and reactive power) of system models with dynamics observed during disturbances in the system, which is called model validation. The grid disturbance (aka. events) can also be used to correct the system model when simulated response is significantly different from the measured values, which is called model calibration. As shown in the right side of FIG. 14, the goal is to achieve a satisfactory match between the measurement data and simulated response. If obvious a discrepancy is observed, then the model calibration process may be employed.

The first step of the model calibration process is parameter identification, which aims to identify a subset of parameters with strong sensitivity to the observed event. In the exemplary embodiment, the model calibration process requires a balance on matching in measurement space and reasonableness in the model parameter space. Numerical curve fitting without adequate engineering guidance tends to provide overfitted parameter results, and leads to non-unique sets of parameters (leading to same curve fitting performance), which should be avoided.

Figure 17:
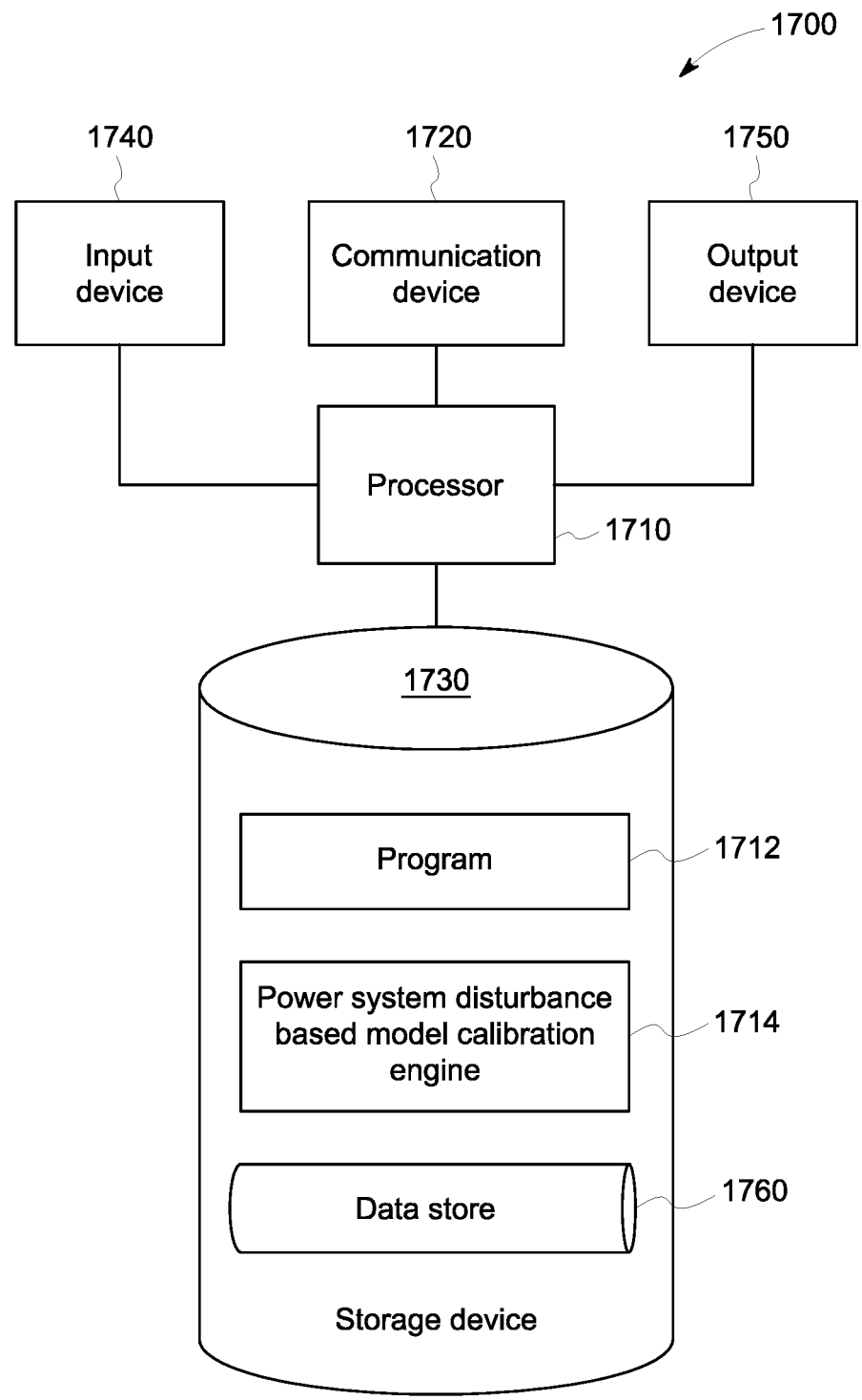
FIG. 17 is a diagram illustrating an exemplary apparatus or platform according to some embodiments.

The embodiments described herein may also be implemented using any number of different hardware configurations. For example, FIG. 17 is a block diagram of an apparatus or platform 1700 that may be, for example, associated with the system 200 of FIG. 2 and/or any other system described herein. The platform 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote measurement units, components, user interfaces, etc. The platform 1700 further includes an input device 1740 (e.g., a computer mouse and/or keyboard to input power grid and/or modeling information) and/an output device 1750

(e.g., a computer monitor to render a display, provide alerts, transmit recommendations, and/or create reports). According to some embodiments, a mobile device, monitoring physical system, and/or PC may be used to exchange information with the platform 1700.

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or a power system disturbance based model calibration engine 1714 for controlling the processor 1710. The processor 1710 performs instructions of the programs 1712, 1714, and thereby operates in accordance with any of the embodiments described herein. For example, the processor 1710 may calibrate a dynamic simulation engine, having system parameters, associated with a component of an electrical power system (e.g., a generator, wind turbine, etc.). The processor 1710 may receive, from a measurement data store 1760, measurement data measured by an electrical power system measurement unit (e.g., a phasor measurement unit, digital fault recorder, or other means of measuring frequency, voltage, current, or power phasors). The processor 1710 may then pre-condition the measurement data and set-up an optimization problem based on a result of the pre-conditioning. The system parameters of the dynamic simulation engine may be determined by solving the optimization problem with an iterative method until at least one convergence criteria is met. According to some embodiments, solving the optimization problem includes a Jacobian approximation that does not call the dynamic simulation engine if an improvement of residual meets a pre-defined criterion.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments, system 500 (shown in FIG. 5) receives event data 308 (shown in FIG. 3A) and model response data associated with a model 260 (shown in FIG. 2) to simulate. The model 260 includes a plurality of parameters. The system 500 divides the event data 308 into a plurality of sets. Each set includes associated parameters. The system 500 transmits the plurality of sets of event data 308 to a plurality of client nodes 510 (shown in FIG. 5), Each client node 510 of the plurality of client nodes 510 is programmed to analyze a corresponding set of event data 308 to determine updated parameters for the model 260. The system 500 receives a plurality of updated parameters for the model 260 from the plurality of client nodes 510. The system 500 analyzes the received plurality of updated parameters to determine at least one adjusted parameter.

In some further embodiments, the system 500 transmits the at least one adjusted parameter to the plurality of client nodes 510. Each client node 510 of the plurality of client nodes 510 is programmed to analyze the previously received set of event data 308 to determine further updated parameters for the model 260. The system 500 receives a plurality of further updated parameters for the model 260 from the plurality of client nodes 510. The system 500 analyzes the received plurality of further updated parameters to determine at least one adjustment to the plurality of parameters. The system 500 compares the plurality of parameters to at least one termination condition to determine whether to terminate or continue transmitting parameters to the plurality of client nodes 510.

In still further embodiments, the event data 308 includes a plurality of events. The system 500 receives a plurality of configurations. The system 500 determines a plurality of scenarios based on the plurality of events and the plurality of configurations. The system 500 distributes the plurality of scenarios to a plurality of client nodes 510.

In some embodiments, the system 500 executes the model 260 in real-time. The system 500 receives a real-time event 512 (shown in FIG. 5). The system 500 evaluates the real-time event 512 based on the model 260. The system 500 recalibrates the model 260 based on the real-time event in response to the evaluation.

In some embodiments, the system 500 receives a plurality of training errors from the plurality of client nodes 510. The system 500 identifies an optimal parameter set of values based on the corresponding training error. The system 500 broadcasts the optimal parameter set of values to the plurality of client nodes 510. The optimal parameter set of values may be used by each client node 510 as the initial value for their individual parameter search.

In some embodiments, the plurality of parameters include a set of parameters, a consensus variable, and a penalty gain. In these embodiments, the system 500 updates the consensus variable based on the analysis of the received plurality of updated parameters. The system 500 transmits the updated consensus variable to each of the plurality of client nodes 510. The system 500 updates the penalty gain based on the analysis of the received plurality of updated parameters. The system transmits the updated penalty gain to each of the plurality of client nodes 510.

In some embodiments, the event data 308 includes a plurality of events. In these embodiments, the system 500 divides the event data 308 into a plurality of sets. At least one set of the plurality of sets includes a variant of one of the plurality of events. In some embodiments, the system 500 divides the plurality of events into the plurality of sets so that each set of the plurality of sets includes a single event. In other embodiments, the system 500 divides the plurality of events into the plurality of sets so that each set of the plurality of sets includes a group of events.

In some embodiments, a system 500 for distributed power system model calibration includes a master node 508 (shown in FIG. 5) and a plurality of client nodes 510 in communication with the master node 508. The master node 508 is programmed to receive event data 308 and model response data associated with a model to simulate. The model 260 includes a plurality of parameters. The master node 508 is also programmed to divide the event data into a plurality of sets. Each set includes associated parameters. The master node 508 is further programmed to transmit the plurality of sets of event data to a plurality of client nodes 510. In addition, the master node 508 is programmed to receive a plurality of updated parameters for the model 260 from the plurality of client nodes 508. Moreover, the master node 508 is programmed to analyze the received plurality of updated parameters to determine at least one adjusted parameter.

In these embodiments, the plurality of client nodes 510 are programmed to receive a set of event data 308 from the master node 508. The plurality of client nodes 510 are also programmed to analyze the set of event data 308 to determine updated parameters for the model 260. The plurality of client nodes 510 are further programmed to transmit the updated parameters to the master node 508.

In some embodiments, the master node 508 is programmed to transmit the at least one adjusted parameter to the plurality of client nodes 510. The master node 508 is also programmed to receive a plurality of further updated parameters for the model 260 from the plurality of client nodes 510. The master node 508 is further programmed to analyze the received plurality of further updated parameters to determine at least one adjustment to the plurality of parameters. The plurality of client nodes 510 are programmed to receive the at least one adjusted parameter. The plurality of client nodes 510 are also programmed to analyze the set of event data 308 with the at least one adjusted parameter to determine further updated parameters for the model 260. The plurality of client nodes 510 are further programmed to transmit the further updated parameters for the model 260 to the master node 508.

In some further embodiments, the master node 508 is further programmed to compare the plurality of parameters to at least one termination condition to determine whether to terminate the process or continue transmitting parameters to the plurality of client nodes 510.

In still further embodiments, the event data 308 includes a plurality of events. The master node 508 is programmed to receive a plurality of configurations. The master node 508 is also programmed to determine a plurality of scenarios based on the plurality of events and the plurality of configurations. The master node 508 is further programmed to distribute the plurality of scenarios to said plurality of client nodes. The plurality of client nodes 510 are each programmed to receive a scenario. The plurality of client nodes 510 are each also programmed to analyze the set of event data with the scenario to determine updated parameters for the model 260. The plurality of client nodes 510 are each further programmed to transmit the updated parameters for the model 260 to the master node 508.

In some embodiments, the plurality of client nodes 510 are programmed to calculate training errors while analyzing the set of event data 308 to determine updated parameters for the model 260. The plurality of client nodes 510 are also programmed to transmit the training errors to said master node 508. The master node 508 is programmed to receive a plurality of training errors from the plurality of client nodes 510. The master node 508 is also programmed to identify an optimal parameter set based on the corresponding training error. The master node 508 is further programmed to broadcast the optimal parameter to the plurality of client nodes 510.

At least one of the technical solutions provided by this system to the technical problems may include: (i) improved speed in modeling parameters; (ii) more robust models in response to measurement noise; (iii) compliance with NERC mandated grid reliability requirements; (iv) reduced chances that an important parameter is not updated; (v) improved accuracy in parameter identifiability; (vi) improved accuracy in parameter estimation; (vii) improved resiliency as there is no single point of failure; and (viii) improved scalability as the number of events and/or size of the model increases.

The methods and systems described herein may be implemented using computer programming or engineering techniques including computer software, firmware, hardware, or any combination or subset thereof, wherein the technical effects may be achieved by performing at least one of the following steps: a) receive event data and model response data associated with a model to simulate, wherein the model includes a plurality of parameters, wherein the event data includes a plurality of events, wherein the plurality of parameters include a set of parameters, a consensus variable, and a penalty gain; b) divide the event data into a plurality of sets, wherein each set includes parameters; c) transmit the plurality of sets of event data to a plurality of client nodes, wherein each client node of the plurality of client nodes is programmed to analyze a corresponding set of event data to determine updated parameters for the model; d) receive a plurality of updated parameters for the model from the plurality of client nodes; e) analyze the received plurality of updated parameters to determine at least one adjusted parameter; f) transmit the at least one adjusted parameter to the plurality of client nodes, wherein each client node of the plurality of client nodes is programmed to analyze a corresponding set of event data to determine further updated parameters for the model; g) receive a plurality of further updated parameters for the model from the plurality of client nodes; h) analyze the received plurality of further updated parameters to determine at least one adjustment to the plurality of parameters; i) compare the plurality of parameters to at least one termination condition to determine whether to terminate or continue transmitting parameters to the plurality of client nodes; j) receive a plurality of configurations; k) determine a plurality of scenarios based on the plurality of events and the plurality of configurations; l) distribute the plurality of scenarios to a plurality of client nodes; m) execute the model in real-time; n) receive a real-time event; o) evaluate the real-time event based on the model; p) recalibrate the model based on the real-time event in response to the evaluation; q) receive a plurality of training errors from the plurality of client nodes; r) identify an optimal parameter set of values based on the corresponding training error, wherein the optimal parameter set of values may be used by each client node as the initial value for their individual parameter search; s) broadcast the optimal parameter set of values to the plurality of client nodes; t) update the consensus variable based on the analysis of the received plurality of updated parameters; u) transmit the updated consensus variable to each of the plurality of client nodes; v) update the penalty gain based on the analysis of the received plurality of updated parameters; w) transmit the updated penalty gain to each of the plurality of client nodes; x) divide the event data into a plurality of sets, wherein at least one set of the plurality of sets includes a variant of one of the plurality of events; y) divide the plurality of events into the plurality of sets so that each set of the plurality of sets includes a single event, and z) divide the plurality of events into the plurality of sets so that each set of the plurality of sets includes a group of events.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing device for distributed power system model calibration comprising at least one processor in communication with at least one memory device and a plurality of client nodes, wherein said at least one processor is programmed to:
receive real-time event data from a physical power system and model response data associated with a model to simulate a power system, wherein the model of the power system includes a plurality of parameters which are associated with the physical power system;
divide the event data into a plurality of sets, wherein each set includes the associated parameters, wherein each set of the plurality of sets includes a real-time power system event associated with the physical power system;
determine a plurality of configurations for the model of the power system;
transmit the plurality of sets of event data and the plurality of configurations of the model of the power system to the plurality of client nodes, wherein each client node of the plurality of client nodes is programmed to analyze a corresponding set of event data to determine updated parameters for the model of the power system using the corresponding configuration;
wherein the analyzing of the corresponding set of event data further includes:
execute the model of the power system based on the corresponding configuration;
validate the model of the power system using current parameters with the corresponding event set and configuration to determine whether the current parameters cause a new response from the model of the power system to match the corresponding event data; and
report the result of the match when the new response from the model of the power system matches the corresponding event data and compare the current parameters to at least one termination condition to determine whether to terminate or continue transmitting parameters to the plurality of client nodes; or
perform model calibration to generate one or more updated parameters when the new response from the model of the power system does not match the corresponding event data, and compare the plurality of updated parameters to at least one termination condition to determine whether to terminate or continue transmitting parameters to the plurality of client nodes;
receive the current parameters or the plurality of updated parameters for the model of the power system from the plurality of client nodes; and
analyze the received plurality of parameters to determine at least one adjusted parameter for the model of the power system.

2. The computing device in accordance with claim 1, wherein said at least one processor is further programmed to:
transmit the at least one adjusted parameter to the plurality of client nodes, wherein each client node of the plurality of client nodes is programmed to analyze the previously received set of event data to determine further updated parameters for the model of the power system;
receive a plurality of further updated parameters for the model of the power system from the plurality of client nodes; and
analyze the received plurality of further updated parameters to determine at least one adjustment to the plurality of parameters.

3. The computing device in accordance with claim 1, wherein the event data includes a plurality of events, and wherein said at least one processor is further programmed to:
determine a plurality of scenarios based on the plurality of events and the plurality of configurations; and
distribute the plurality of scenarios to a plurality of client nodes.

4. The computing device in accordance with claim 1, wherein said at least one processor is further programmed to:
execute the model of the power system in real-time; and
evaluate the real-time event based on the model of the power system.

5. The computing device in accordance with claim 4, wherein said at least one processor is further programmed to recalibrate the model of the power system based on the real-time event in response to the evaluation.

6. The computing device in accordance with claim 1, wherein said at least one processor is further programmed to:
receive a plurality of training errors from the plurality of client nodes;
identify an optimal parameter set of values based on the corresponding training error; and
broadcast the optimal parameter set of values to the plurality of client nodes.

7. The computing device in accordance with claim 6, wherein the optimal parameter set of values may be used by each client node as an initial value for their individual parameter search.

8. The computing device in accordance with claim 1, wherein the plurality of parameters include a set of parameters, a consensus variable, and a penalty gain.

9. The computing device in accordance with claim 8, wherein said at least one processor is further programmed to:
update the consensus variable based on the analysis of the received plurality of updated parameters; and
transmit the updated consensus variable to each of the plurality of client nodes.

10. The computing device in accordance with claim 8, wherein said at least one processor is further programmed to:
update the penalty gain based on the analysis of the received plurality of updated parameters; and
transmit the updated penalty gain to each of the plurality of client nodes.

11. The computing device in accordance with claim 1, wherein the event data includes a plurality of events, and wherein said at least one processor is further programmed to:
divide the event data into a plurality of sets, wherein at least one set of the plurality of sets includes a variant of one of the plurality of events.

12. The computing device in accordance with claim 1, wherein the event data includes a plurality of events, and wherein said at least one processor is further programmed to divide the plurality of events into the plurality of sets so that each set of the plurality of sets includes a single event.

13. The computing device in accordance with claim 1, wherein the event data includes a plurality of events, and wherein said at least one processor is further programmed to divide the plurality of events into the plurality of sets so that each set of the plurality of sets includes a group of events.

14. A system for distributed power system model calibration comprising:
a master node; and
a plurality of client nodes in communication with said master node,
wherein said master node is programmed to:
receive real-time event data from a physical power system and model response data associated with a model to simulate a power system, wherein the model of the power system includes a plurality of parameters which are associated with the physical power system;
divide the event data into a plurality of sets, wherein each set includes the associated parameters, wherein each set of the plurality of sets includes a real-time power system event associated with the physical power system;
determine a plurality of configurations for the model of the power system;
transmit the plurality of sets of event data and the plurality of configurations of the model of the power system to the plurality of client nodes;
receive a plurality of updated parameters for the model of the power system from the plurality of client nodes; and
analyze the received plurality of updated parameters to determine at least one adjusted parameter for the model of the power system, and
wherein said plurality of client nodes are programmed to:
receive a set of event data from the master node;
analyze the set of event data to determine updated parameters for the model of the power system using the corresponding configuration; and
wherein the analyzing of the corresponding set of event data further includes:
execute the model of the power system based on the corresponding configuration;
validate the model of the power system using current parameters with the corresponding event set and configuration to determine whether the current parameters cause a new response from the model of the power system to match the corresponding event data; and
report the result of the match when the new response from the model of the power system matches the corresponding event data and compare the current parameters to at least one termination condition to determine whether to terminate or continue transmitting parameters to the plurality of client nodes; or
perform model calibration to generate one or more updated parameters when the new response from the model of the power system does not match the corresponding event data, and compare the plurality of updated parameters to at least one termination condition to determine whether to terminate or continue transmitting parameters to the plurality of client nodes; and
transmit the current parameters or the updated parameters to the master node.

15. The system in accordance with claim 14, wherein said master node is further programmed to:
transmit the at least one adjusted parameter to said plurality of client nodes;
receive a plurality of further updated parameters for the model of the power system from said plurality of client nodes;
analyze the received plurality of further updated parameters to determine at least one adjustment to the plurality of parameters
and wherein said plurality of client nodes are further programmed to:
receive the at least one adjusted parameter;
analyze the set of event data with the at least one adjusted parameter to determine further updated parameters for the model of the power system; and
transmit the further updated parameters for the model of the power system to said master node.

16. The system in accordance with claim 14, wherein the event data includes a plurality of events, and wherein said master node is further programmed to:
determine a plurality of scenarios based on the plurality of events and the plurality of configurations; and
distribute the plurality of scenarios to said plurality of client nodes, and
wherein said plurality of client nodes are programmed to:
receive a scenario;
analyze the set of event data with the scenario to determine updated parameters for the model of the power system; and
transmit the updated parameters for the model of the power system to the master node.

17. The system in accordance with claim 14, wherein said plurality of client nodes are programmed to:
calculate training errors while analyzing the set of event data to determine updated parameters for the model of the power system; and
transmit the training errors to said master node, and
wherein said master node is further programmed to:
receive a plurality of training errors from said plurality of client nodes;
identify an optimal parameter set based on the corresponding training error; and
broadcast the optimal parameter to said plurality of client nodes.

18. A method for distributed power system model calibration, the method implemented on a computing device including at least one processor in communication with at least one memory device, the method comprises:
receiving real-time event data from a physical power system and model response data associated with a model to simulate a power system, wherein the model of the power system includes a plurality of parameters which are associated with the physical power system;

dividing the event data into a plurality of sets, wherein each set includes the associated parameters, wherein each set of the plurality of sets includes a real-time power system event associated with the physical power system;

transmitting the plurality of sets of event data and the plurality of configurations of the model of the power system to the plurality of client nodes, wherein each client node of the plurality of client nodes is programmed to analyze a corresponding set of event data to determine updated parameters for the model of the power system using the corresponding configuration;

wherein the analyzing of the corresponding set of event data further includes:
  execute the model of the power system based on the corresponding configuration;
  validate the model of the power system using current parameters with the corresponding event set and configuration to determine whether the current parameters cause a new response from the model of the power system to match the corresponding event data; and
  report the result of the match when the new response from the model of the power system matches the corresponding event data and compare the current parameters to at least one termination condition to determine whether to terminate or continue transmitting parameters to the plurality of client nodes; or
perform model calibration to generate one or more updated parameters when the new response from the model of the power system does not match the corresponding event data, and compare the plurality of updated parameters to at least one termination condition to determine whether to terminate or continue transmitting parameters to the plurality of client nodes;

receiving the current parameters or the plurality of updated parameters for the model of the power system from the plurality of client nodes;

analyzing the received plurality of parameters to determine at least one adjustment to the plurality of parameters;

transmitting the adjusted parameters to the plurality of client nodes, wherein each client node of the plurality of client nodes is programmed to analyze a corresponding set of event data to determine further updated parameters for the model of the power system;

receiving a plurality of further updated parameters for the model of the power system from the plurality of client nodes; and analyzing the received plurality of further updated parameters to determine at least one adjustment to the plurality of parameters.

* * * * *